(12) United States Patent
Komatsu

(10) Patent No.: US 7,512,992 B2
(45) Date of Patent: Mar. 31, 2009

(54) ELECTRIC EQUIPMENT, AND METHOD AND PROGRAM FOR PREVENTING UNAUTHORIZED USE OF SAME

(75) Inventor: Yoshiharu Komatsu, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 804 days.

(21) Appl. No.: 10/635,677

(22) Filed: Aug. 7, 2003

(65) Prior Publication Data

US 2004/0044903 A1 Mar. 4, 2004

(30) Foreign Application Priority Data

Aug. 8, 2002 (JP) .............................. 2002-231806

(51) Int. Cl.
*G06F 1/26* (2006.01)
(52) U.S. Cl. .............................. 726/34; 726/17; 726/19; 726/35; 379/39
(58) Field of Classification Search .................. 726/35, 726/17, 19, 34; 379/39
See application file for complete search history.

(56) References Cited

U.S. PATENT DOCUMENTS

| | | | | |
|---|---|---|---|---|
| 5,838,793 A | * | 11/1998 | Lewis | 340/5.65 |
| 5,911,777 A | * | 6/1999 | Heredia | 726/35 |
| 6,032,257 A | * | 2/2000 | Olarig et al. | 726/35 |
| 6,087,937 A | * | 7/2000 | McCarthy | 340/567 |
| 6,151,678 A | * | 11/2000 | Davis | 726/35 |
| 6,507,914 B1 | * | 1/2003 | Cain et al. | 726/35 |
| 6,553,495 B1 | * | 4/2003 | Johansson et al. | 726/35 |
| 6,594,765 B2 | * | 7/2003 | Sherman et al. | 726/35 |
| 6,643,781 B1 | * | 11/2003 | Merriam | 726/35 |
| 6,647,498 B1 | * | 11/2003 | Cho | 726/17 |
| 6,857,076 B1 | * | 2/2005 | Klein | 713/189 |
| 7,093,300 B1 | * | 8/2006 | Harada et al. | 726/34 |
| 7,096,370 B1 | * | 8/2006 | Klein | 713/193 |
| 7,114,082 B2 | * | 9/2006 | Klein | 713/193 |

(Continued)

FOREIGN PATENT DOCUMENTS

JP 10-49493 A 2/1998

(Continued)

*Primary Examiner*—Kimyen Vu
*Assistant Examiner*—April Y Shan
(74) *Attorney, Agent, or Firm*—Sughrue Mion, PLLC

(57) ABSTRACT

Electric equipment, and a method and a program for preventing the unauthorized use of same, by which it is possible to prevent the theft of electric equipment installed in an environment where the electric equipment is available for the use of an unspecified number of users and the stealing of information stored in the electric equipment. The electric equipment comprises: an operation limiting section for setting a function limit to make at least part of functions of the electric equipment unavailable; an I/F for connecting an external device to the electric equipment; an external device information obtaining section for obtaining device identification information from an external device connected via the interface to the electric equipment to identify the device; a write control section for associating the function limit with the device identification information of a prescribed external device to thereby obtain a cryptographic key; an NVRAM for storing the cryptographic key; and a comparator for determining whether or not the device identification information obtained from an external device connected via the interface to the electric equipment matches the cryptographic key stored in the NVRAM. The operation limiting section cancels the function limit when the comparator determines that the obtained information matches the cryptographic key.

12 Claims, 15 Drawing Sheets

U.S. PATENT DOCUMENTS

| | | | | |
|---|---|---|---|---|
| 7,139,912 B2 * | 11/2006 | Feinberg | ................... | 713/168 |
| 7,266,849 B1 * | 9/2007 | Gregory et al. | ................ | 726/34 |
| 2002/0083348 A1 * | 6/2002 | Watanabe et al. | ........... | 713/202 |
| 2002/0108058 A1 * | 8/2002 | Iwamura | ................... | 713/201 |
| 2002/0194499 A1 * | 12/2002 | Audebert et al. | ............ | 713/201 |
| 2002/0194500 A1 * | 12/2002 | Bajikar | ...................... | 713/201 |
| 2003/0014660 A1 * | 1/2003 | Verplaetse et al. | .......... | 713/200 |
| 2003/0034890 A1 * | 2/2003 | Baumeister et al. | ...... | 340/568.1 |
| 2003/0065934 A1 * | 4/2003 | Angelo et al. | ............... | 713/200 |
| 2004/0030919 A1 * | 2/2004 | Moriya et al. | ............... | 713/200 |

FOREIGN PATENT DOCUMENTS

| | | | | |
|---|---|---|---|---|
| JP | | 10049493 A | * | 2/1998 |
| JP | | 2001-223691 A | | 8/2001 |

* cited by examiner

F I G. 7
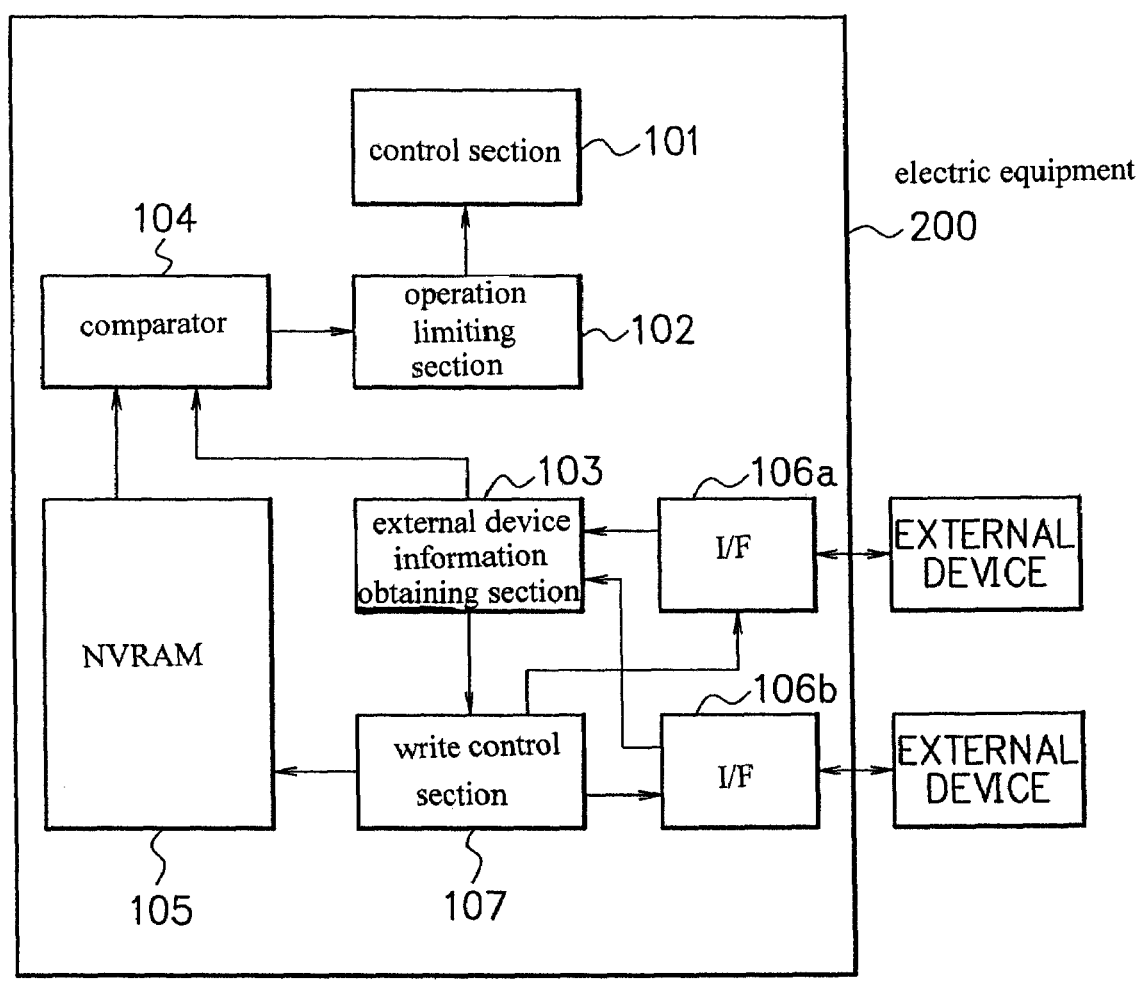

F I G. 11
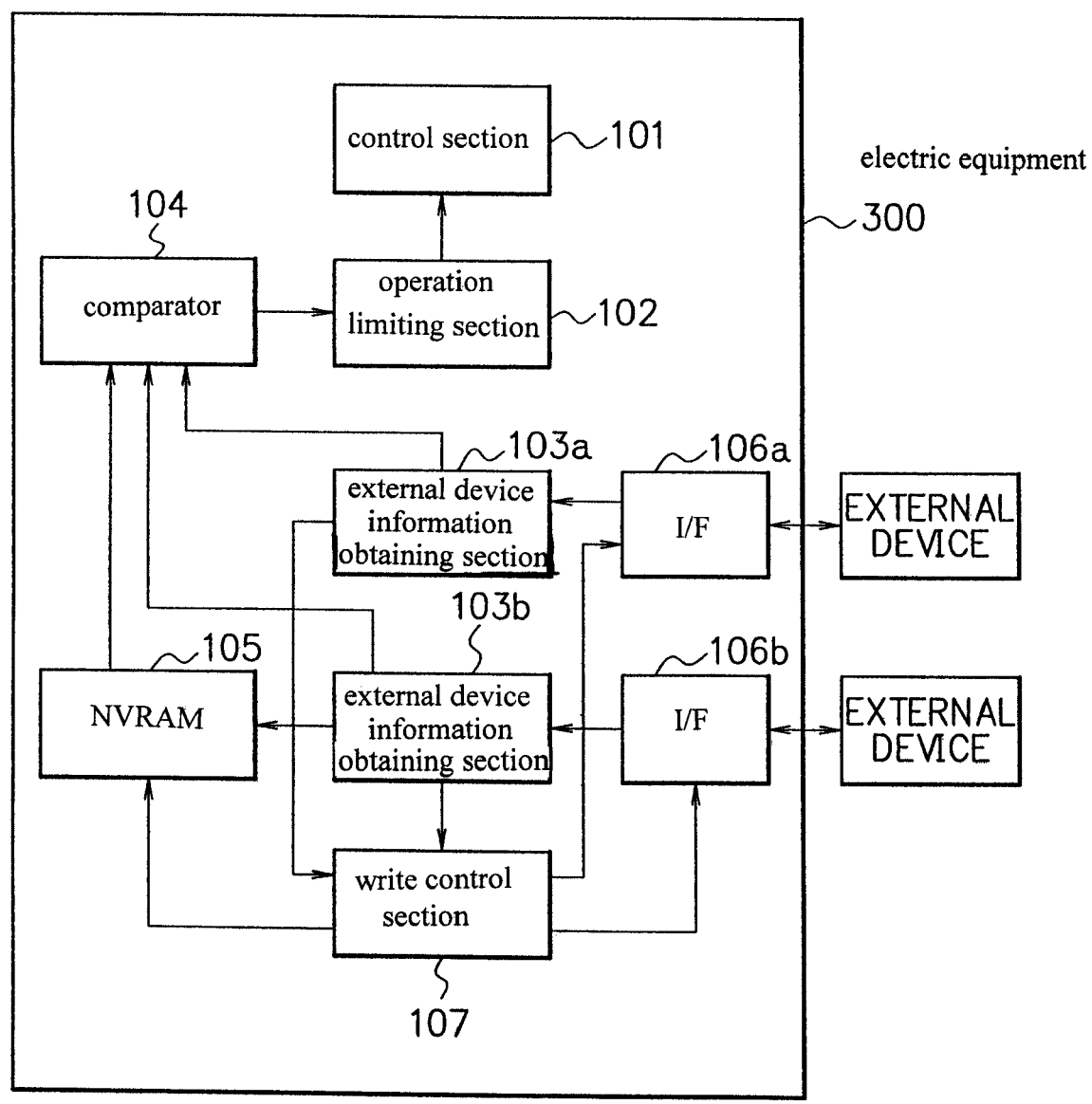

FIG. 13

| CRYPTOGRAPHIC KEY ||
|---|---|
| I/F | DEVICE IDENTIFICATION INFORMATION |
| A | C |
| B | D |

F I G. 15

| CRYPTOGRAPHIC KEY | AVAILABLE FUNCTION |
|---|---|
| A | All |
| B | Read, Write |
| C | Read |
| Default | Nothing |

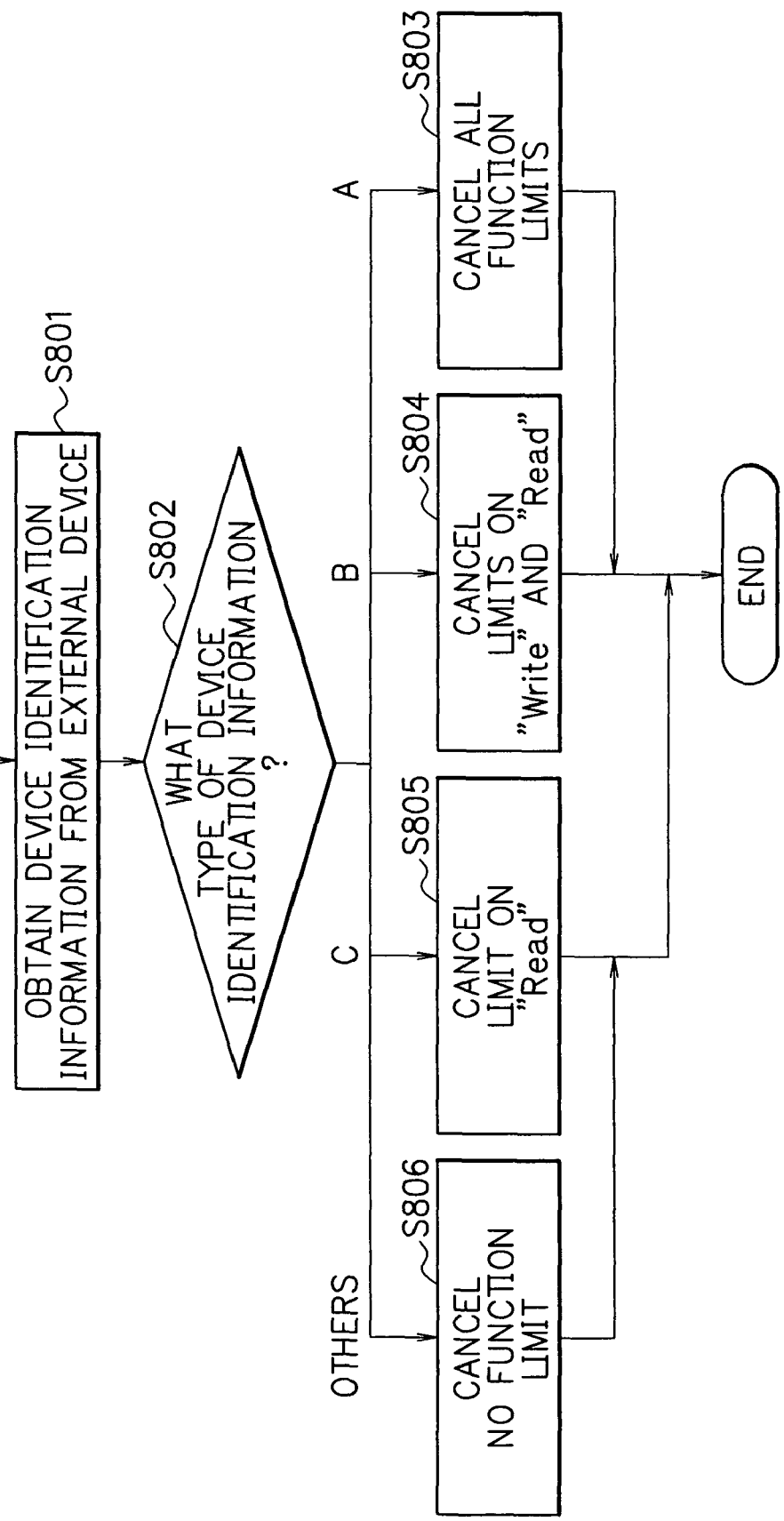

ELECTRIC EQUIPMENT, AND METHOD AND PROGRAM FOR PREVENTING UNAUTHORIZED USE OF SAME

FIELD OF THE INVENTION

The present invention relates to electric equipment which cannot be used by unauthorized users, and a method and a program for preventing the unauthorized use of the electric equipment, and more particularly, to electric equipment which prevents unauthorized use making use of an external device connected thereto as a physical key, and a method and a program for preventing the unauthorized use of same.

BACKGROUND OF THE INVENTION

When electric equipment is installed in an environment where the equipment is available for the use of an unspecified number of users, it is generally required to have security features for preventing theft and the stealing of information.

In order to prevent the theft of electric equipment, for example, electric equipment can be fastened to a desk or the like with a chain, a wire, etc so as not to move beyond a certain distance from its installation location.

Besides, in order to prevent the stealing of information, a password can be assigned to electric equipment so that users who do not know the password cannot use it. For the same purpose, a device for authenticating users (e.g. card reader) can be connected to or installed in electric equipment.

However, even if the electric equipment is fixed with a chain, a wire, etc., it can be stolen by cutting the chain. In addition, the electric equipment needs to have a configuration for attaching a chain or a wire on its body, which imposes limits on the design of the exterior of the equipment.

Moreover, even when a password is assigned to the electric equipment or information, if the password has leaked out to a user who is not authorized to access the information by, for example, "over shoulder cracking" or "shoulder hacking", the user can steal the information through an unauthorized access.

Further, a user who intends to steal information can find out the password by a "brute force attack" or "brute force password cracking" if he/she has enough time. A person who has a good knowledge of electric equipment and passwords can choose a password others will not be able to guess. However, a password which is difficult to find out is ultimately a complex password containing many digits, and users who are not quite accustomed to electric equipment would find it difficult to use such password. Even a person who set a password can forget the password and lose access to the electric equipment.

Still further, electric equipment and a system employing the electric equipment command a higher price when a user-authenticating device such as a card reader is connected to or installed in the electric equipment. Additionally, it is sometimes difficult to install a user-authenticating device in a small-scale system adopting a PDA (Personal Digital Assistant).

As described above, sufficient measures have not been taken to prevent the theft of electric equipment and the stealing of information.

As an example of the prior art for increasing the security of a computer system, Japanese Patent Application laid open No. HEI10-49493 discloses "Computer System". In the computer system according to the prior art, a computer and peripheral devices are provided with nonvolatile memories, respectively, for registering identification numbers. When one peripheral device is connected to the computer, the computer obtains a registration number from the connected peripheral device, and determines whether or not the registration number matches that of the computer. The computer allows a user the use of the peripheral device only when the two numbers match.

The above-mentioned computer system, however, is aimed at preventing the stealing of the peripheral devices connected to the computer. That is, in the above-mentioned computer system, the computer makes the peripheral devices nonusable when registration numbers obtained from them do not match the registration number of the computer. In other words, the computer system is not aimed at preventing the theft of electric equipment and the stealing of information.

SUMMARY OF THE INVENTION

It is therefore an object of the present invention to provide electric equipment, and a method and a program for preventing the unauthorized use of same, by which it is possible to prevent the theft of electric equipment installed in an environment where the electric equipment is available for the use of an unspecified number of users and the stealing of information stored in the electric equipment.

In accordance with the first aspect of the present invention, to achieve the above object, there is provided electric equipment comprising: a function limiting section for setting a limit (function limit) to the execution of at least part of functions of the electric equipment to make the part of functions unavailable; an interface for connecting an external device to the electric equipment; a section for obtaining device identification information from an external device connected via the interface to the electric equipment to identify the device; a section for associating the function limit with the device identification information of a prescribed external device to thereby obtain a cryptographic key; a memory for storing the cryptographic key; a determining section for determining whether or not the device identification information obtained from an external device connected via the interface to the electric equipment matches the device identification information of the cryptographic key stored in the memory; and a limit canceling section for canceling the function limit set by the function limiting section when the determining section determines that the obtained information matches the cryptographic key.

In accordance with the second aspect of the present invention, there is provided electric equipment comprising: a function limiting section for setting one or more limits (function limits) to the execution of at least part of functions of the electric equipment to make the part of functions unavailable; an interface for connecting an external device to the electric equipment; a section for obtaining device identification information from an external device connected via the interface to the electric equipment to identify the device; a section for associating each function limit with the device identification information of a prescribed external device to thereby obtain a cryptographic key; a memory for storing the cryptographic key; a determining section for determining whether or not the device identification information obtained from an external device connected via the interface to the electric equipment matches the device identification information included in the cryptographic key stored in the memory; and a limit canceling section for canceling each function limit set by the function limiting section when the determining section determines that the obtained information matches the device identification information associated with the function limit.

In accordance with the third aspect of the present invention, there is provided electric equipment comprising: a function limiting section for setting a limit (function limit) to the execution of at least part of functions of the electric equipment to make the part of functions unavailable; a plurality of interfaces for connecting external devices to the electric equipment; a section for obtaining device identification information from an external device connected via one of the interfaces to the electric equipment to identify the device; a section for associating the function limit with the specific device identification information or a combination of plural pieces of specific device identification information to thereby obtain a cryptographic key; a memory for storing the cryptographic key; a determining section for determining whether or not the device identification information obtained from each external device connected via one of the interfaces to the electric equipment matches the device identification information of the cryptographic key stored in the memory; and a limit canceling section for canceling the function limit set by the function limiting section when the determining section determines that the obtained information matches the cryptographic key.

In accordance with the fourth aspect of the present invention, there is provided electric equipment comprising: a function limiting section for setting a limit (function limit) to the execution of at least part of functions of the electric equipment to make the part of functions unavailable; a plurality of interfaces for connecting external devices to the electric equipment; a section for obtaining device identification information from an external device connected via one of the interfaces to the electric equipment to identify the device; a section for generating connection route information indicating which interface is used to connect the external device that has provided the device identification information; a section for associating the function limit with a combination of prescribed device identification information and relevant connection route information to thereby obtain a cryptographic key; a memory for storing at least one cryptographic key; a determining section for determining whether or not a combination of the device identification information obtained from each external device connected via one of the interfaces to the electric equipment and the connection route information for the external device matches the cryptographic key stored in the memory; and a limit canceling section for canceling the function limit set by the function limiting section when the determining section determines that the combination of the obtained information and connection route information matches the cryptographic key.

In accordance with the fifth aspect of the present invention, there is provided electric equipment comprising: a function limiting section for setting one or more limits (function limits) to the execution of at least part of functions of the electric equipment to make the part of functions unavailable; a plurality of interfaces for connecting external devices to the electric equipment; a section for obtaining device identification information from an external device connected via one of the interfaces to the electric equipment to identify the device; a section for associating each function limit with the specific device identification information or a combination of plural pieces of specific device identification information to thereby obtain a cryptographic key; a memory for storing at least one cryptographic key; a determining section for determining whether or not the device identification information obtained from each external device connected via one of the interfaces to the electric equipment matches the device identification information of any one of the cryptographic keys stored in the memory; and a limit canceling section for canceling each function limit set by the function limiting section when the determining section determines that the obtained information matches the device identification information of the cryptographic key related to the function limit.

In accordance with the sixth aspect of the present invention, there is provided electric equipment comprising: a function limiting section for setting one or more limits (function limits) to the execution of at least part of functions of the electric equipment to make the part of functions unavailable; a plurality of interfaces for connecting external devices to the electric equipment; a section for obtaining device identification information from an external device connected via one of the interfaces to the electric equipment to identify the device; a section for generating connection route information indicating which interface is used to connect the external device that has provided the device identification information; a section for associating the function limit with a combination of prescribed device identification information and relevant connection route information to thereby obtain a cryptographic key; a memory for storing at least one cryptographic key; a determining section for determining whether or not a combination of the device identification information obtained from each external device connected via one of the interfaces to the electric equipment and the connection route information for the external device matches any one of the cryptographic keys stored in the memory; and a limit canceling section for canceling each function limit set by the function limiting section when the determining section determines that the combination of the obtained information and connection route information matches the cryptographic key related to the function limit.

In the aforementioned first to sixth aspects of the present invention, it is preferable that the electric equipment further comprises a section for having the external device(s) store information that uniquely identifies the external device(s) as the device identification information when the external device(s) is capable of storing information. It is also preferable that the electric equipment further comprises a section for resetting the function limit when a prescribed period of time has passed after the determining section made a determination.

In accordance with the seventh aspect of the present invention, there is provided a method for preventing the unauthorized use of electric equipment including an interface to connect an external device thereto, comprising: a function limiting step for setting a limit (function limit) to the execution of at least part of functions of the electric equipment to make the part of functions unavailable; a first device identification information obtaining step for obtaining device identification information from an external device connected via the interface to the electric equipment to identify the device; a step for associating the function limit with the device identification information obtained at the first device identification information obtaining step to thereby obtain a cryptographic key; a step for storing the cryptographic key in a memory; a second device identification information obtaining step for obtaining device identification information from an external device connected via the interface to the electric equipment to identify the device; a determining step for determining whether or not the device identification information obtained at the second device identification information obtaining step matches the device identification information of the cryptographic key stored in the memory; and a limit canceling step for canceling the function limit set at the function limiting step when it is determined at the determining step that the information obtained at the second device identification information obtaining step matches the cryptographic key.

In accordance with the eighth aspect of the present invention, there is provided a method for preventing the unauthorized use of electric equipment including an interface to connect an external device thereto, comprising: a function limiting step for setting one or more limits (function limits) to the execution of at least part of functions of the electric equipment to make the part of functions unavailable; a first device identification information obtaining step for obtaining device identification information from an external device connected via the interface to the electric equipment to identify the device; a step for associating each function limit with the device identification information of a prescribed external device to thereby obtain a cryptographic key; a step for storing the cryptographic key in a memory; a second device identification information obtaining step for obtaining device identification information from an external device connected via the interface to the electric equipment to identify the device; a determining step for determining whether or not the device identification information obtained at the second device identification information obtaining step matches the device identification information included in the cryptographic key stored in the memory; and a limit canceling step for canceling each function limit set at the function limiting step when it is determined at the determining step that the information obtained at the second device identification information obtaining step matches the device identification information of the cryptographic key related to the function limit.

In accordance with the ninth aspect of the present invention, there is provided a method for preventing the unauthorized use of electric equipment including a plurality of interfaces to connect external devices thereto, comprising: a function limiting step for setting a limit (function limit) to the execution of at least part of functions of the electric equipment to make the part of functions unavailable; a first device identification information obtaining step for obtaining device identification information from each external device connected via one of the interfaces to the electric equipment to identify the device; a step for associating the function limit with the specific device identification information or a combination of plural pieces of specific device identification information to thereby obtain a cryptographic key; a step for storing the cryptographic key in a memory; a second device identification information obtaining step for obtaining device identification information from each external device connected via one of the interfaces to the electric equipment to identify the device; a determining step for determining whether or not the device identification information or a combination of plural pieces of device identification information obtained at the second device identification information obtaining step matches the device identification information of the cryptographic key stored in the memory; and a limit canceling step for canceling the function limit set at the function limiting step when it is determined at the determining step that the information obtained at the second device identification information obtaining step matches the cryptographic key.

In accordance with the tenth aspect of the present invention, there is provided a method for preventing the unauthorized use of electric equipment including a plurality of interfaces to connect external devices thereto, comprising: a function limiting step for setting a limit (function limit) to the execution of at least part of functions of the electric equipment to make the part of functions unavailable; a first device identification information obtaining step for obtaining device identification information from each external device connected via one of the interfaces to the electric equipment to identify the device; a first connection route information generating step for generating first connection route information indicating which interface is used to connect the external device to the electric equipment at the first device identification information obtaining step; a step for associating the function limit with a combination of prescribed device identification information and relevant connection route information to thereby obtain a cryptographic key; a step for storing the cryptographic key in a memory; a second device identification information, obtaining step for obtaining device identification information from each external device connected via one of the interfaces to the electric equipment to identify the device; a second connection route information generating step for generating second connection route information indicating which interface is used to connect the external device to the electric equipment at the second device identification information obtaining step; a determining step for determining whether or not a combination of the device identification information obtained at the second device identification information obtaining step and the second connection route information matches the cryptographic key stored in the memory; and a limit canceling step for canceling the function limit set at the function limiting step when it is determined at the determining step that the combination of the information obtained at the second device identification information obtaining step and the second connection route information matches the cryptographic key.

In accordance with the eleventh aspect of the present invention, there is provided a method for preventing the unauthorized use of electric equipment including a plurality of interfaces to connect external devices thereto, comprising: a function limiting step for setting one or more limits (function limits) to the execution of at least part of functions of the electric equipment to make the part of functions unavailable; a first device identification information obtaining step for obtaining device identification information from each external device connected via one of the interfaces to the electric equipment to identify the device; a step for associating each function limit with the specific device identification information or a combination of plural pieces of specific device identification information to thereby obtain a cryptographic key; a step for storing the cryptographic key in a memory; a second device identification information obtaining step for obtaining device identification information from each external device connected via one of the interfaces to the electric equipment to identify the device; a determining step for determining whether or not the device identification information or a combination of plural pieces of device identification information obtained at the second device identification information obtaining step matches the device identification information of any one of the cryptographic keys stored in the memory; and a limit canceling step for canceling each function limit set at the function limiting step when it is determined at the determining step that the information obtained at the second device identification information obtaining step matches the device identification information of the cryptographic key related to the function limit.

In accordance with the twelfth aspect of the present invention, there is provided a method for preventing the unauthorized use of electric equipment including a plurality of interfaces to connect external devices thereto, comprising: a function limiting step for setting one or more limits (function limits) to the execution of at least part of functions of the electric equipment to make the part of functions unavailable; a first device identification information obtaining step for obtaining device identification information from each external device connected via one of the interfaces to the electric equipment to identify the device; a first connection route information generating step for generating first connection route information indicating which interface is used to connect the external device to the electric equipment at the first device identification information obtaining step; a step for associating the function limit with a combination of prescribed device identification information and the first connection route information to thereby obtain a cryptographic key; a step for storing the cryptographic key in a memory; a second device identification information obtaining step for obtaining device identification information from each external device connected via one of the interfaces to the electric equipment to identify the device; a second connection route information generating step for generating second connection route information indicating which interface is used to connect the external device to the electric equipment at the second device identification information obtaining step; a determining step for determining whether or not a combination of the device identification information obtained at the second device identification information obtaining step and the second connection route information matches any one of the cryptographic keys stored in the memory; and a limit canceling step for canceling each function limit set at the function limiting step when it is determined at the determining step that the combination of the information obtained at the second device identification information obtaining step and the second connection route information matches the cryptographic key related to the function limit.

In the aforementioned seventh to twelfth aspects of the present invention, it is preferable that the method for preventing the unauthorized use of electric equipment further comprises a step for having the external device(s) store information that uniquely identifies the external device(s) as the device identification information after the first device identification information obtaining step when the external device(s) connected to the electric equipment at the first device identification information obtaining step is capable of storing information. It is also preferable that the method further comprises a step for resetting the function limit when a prescribed period of time has passed after the determining step.

In accordance with the thirteenth aspect of the present invention, there is provided a program for preventing the unauthorized use of electric equipment, which is built into the electric equipment including an interface to connect an external device thereto and makes a computer having effective control over the electric equipment execute steps as follows: a function limiting step for setting a limit (function limit) to the execution of at least part of functions of the electric equipment to make the part of functions unavailable; a first device identification information obtaining step for obtaining device identification information from an external device connected via the interface to the electric equipment to identify the device; a step for associating the function limit with the device identification information obtained at the first device identification information obtaining step to thereby obtain a cryptographic key; a step for storing the cryptographic key in a memory; a second device identification information obtaining step for obtaining device identification information from an external device connected via the interface to the electric equipment to identify the device; a determining step for determining whether or not the device identification information obtained at the second device identification information obtaining step matches the device identification information of the cryptographic key stored in the memory; and a limit canceling step for canceling the function limit set at the function limiting step when it is determined at the determining step that the information obtained at the second device identification information obtaining step matches the cryptographic key.

In accordance with the fourteenth aspect of the present invention, there is provided a program for preventing the unauthorized use of electric equipment, which is built into the electric equipment including an interface to connect an external device thereto and makes a computer having effective control over the electric equipment execute steps as follows: a function limiting step for setting one or more limits (function limits) to the execution of at least part of functions of the electric equipment to make the part of functions unavailable; a first device identification information obtaining step for obtaining device identification information from an external device connected via the interface to the electric equipment to identify the device; a step for associating each function limit with the device identification information of a prescribed external device to thereby obtain a cryptographic key; a step for storing the cryptographic key in a memory; a second device identification information obtaining step for obtaining device identification information from an external device connected via the interface to the electric equipment to identify the device; a determining step for determining whether or not the device identification information obtained at the second device identification information obtaining step matches the device identification information included in any one of the cryptographic keys stored in the memory; and a limit canceling step for canceling each function limit set at the function limiting step when it is determined at the determining step that the information obtained at the second device identification information obtaining step matches the device identification information of the cryptographic key related to the function limit.

In accordance with the fifteenth aspect of the present invention, there is provided a program for preventing the unauthorized use of electric equipment, which is built into the electric equipment including a plurality of interfaces to connect external devices thereto and makes a computer having effective control over the electric equipment execute steps as follows: a function limiting step for setting a limit (function limit) to the execution of at least part of functions of the electric equipment to make the part of functions unavailable; a first device identification information obtaining step for obtaining device identification information from each external device connected via one of the interfaces to the electric equipment to identify the device; a step for associating the function limit with specific device identification information or a combination of plural pieces of specific device identification information to thereby obtain a cryptographic key; a step for storing the cryptographic key in a memory; a second device identification information obtaining step for obtaining device identification information from each external device connected via one of the interfaces to the electric equipment to identify the device; a determining step for determining whether or not the device identification information or a combination of plural pieces of device identification information obtained at the second device identification information obtaining step matches the device identification information of the cryptographic key stored in the memory; and a limit canceling step for canceling the function limit set at the function limiting step when it is determined at the determining step that the information obtained at the second device identification information obtaining step matches the cryptographic key.

In accordance with the sixteenth aspect of the present invention, there is provided a program for preventing the unauthorized use of electric equipment, which is built into the electric equipment including a plurality of interfaces to connect external devices thereto and makes a computer having effective control over the electric equipment execute steps as follows: a function limiting step for setting a limit (function limit) to the execution of at least part of functions of the electric equipment to make the part of functions unavailable; a first device identification information obtaining step for obtaining device identification information from each external device connected via one of the interfaces to the electric equipment to identify the device; a first connection route information generating step for generating first connection route information indicating which interface is used to connect the external device to the electric equipment at the first device identification information obtaining step; a step for associating the function limit with a combination of prescribed device identification information and relevant connection route information to thereby obtain a cryptographic key; a step for storing the cryptographic key in a memory; a second device identification information obtaining step for obtaining device identification information from each external device connected via one of the interfaces to the electric equipment to identify the device; a second connection route information generating step for generating second connection route information indicating which interface is used to connect the external device to the electric equipment at the second device identification information obtaining step; a determining step for determining whether or not a combination of the device identification information obtained at the second device identification information obtaining step and the second connection route information matches the cryptographic key stored in the memory; and a limit canceling step for canceling the function limit set at the function limiting step when it is determined at the determining step that the combination of the information obtained at the second device identification information obtaining step and the second connection route information matches the cryptographic key.

In accordance with the seventeenth aspect of the present invention, there is provided a program for preventing the unauthorized use of electric equipment, which is built into the electric equipment including a plurality of interfaces to connect external devices thereto and makes a computer having effective control over the electric equipment execute steps as follows: a function limiting step for setting one or more limits (function limits) to the execution of at least part of functions of the electric equipment to make the part of functions unavailable; a first device identification information obtaining step for obtaining device identification information from each external device connected via one of the interfaces to the electric equipment to identify the device; a step for associating each function limit with the specific device identification information or a combination of plural pieces of specific device identification information to thereby obtain a cryptographic key; a step for storing the cryptographic key in a memory; a second device identification information obtaining step for obtaining device identification information from each external device connected via one of the interfaces to the electric equipment to identify the device; a determining step for determining whether or not the device identification information or a combination of plural pieces of device identification information obtained at the second device identification information obtaining step matches the device identification information of any one of the cryptographic keys stored in the memory; and a limit canceling step for canceling each function limit set at the function limiting step when it is determined at the determining step that the information obtained at the second device identification information obtaining step matches the device identification information of the cryptographic key related to the function limit.

In accordance with the eighteenth aspect of the present invention, there is provided a program for preventing the unauthorized use of electric equipment, which is built into the electric equipment including a plurality of interfaces to connect external devices thereto and makes a computer having effective control over the electric equipment execute steps as follows: a function limiting step for setting one or more limits (function limits) to the execution of at least part of functions of the electric equipment to make the part of functions unavailable; a first device identification information obtaining step for obtaining device identification information from each external device connected via one of the interfaces to the electric equipment to identify the device; a first connection route information generating step for generating first connection route information indicating which interface is used to connect the external device to the electric equipment at the first device identification information obtaining step; a step for associating the function limit with a combination of prescribed device identification information and the first connection route information to thereby obtain a cryptographic key; a step for storing at least one cryptographic key in a memory; a second device identification information obtaining step for obtaining device identification information from each external device connected via one of the interfaces to the electric equipment to identify the device; a second connection route information generating step for generating second connection route information indicating which interface is used to connect the external device to the electric equipment at the second device identification information obtaining step; a determining step for determining whether or not a combination of the device identification information obtained at the second device identification information obtaining step and the second connection route information matches any one of the cryptographic keys stored in the memory; and a limit canceling step for canceling each function limit set at the function limiting step when it is determined at the determining step that the combination of the information obtained at the second device identification information obtaining step and the second connection route information matches the cryptographic key related to the function limit.

In the aforementioned thirteenth to eighteenth aspects of the present invention, it is preferable that the program for preventing the unauthorized use of electric equipment makes the computer having effective control over the electric equipment execute a step for having the external device(s) store information that uniquely identifies the external device(s) as the device identification information after the first device identification information obtaining step when the external device(s) connected to the electric equipment at the first device identification information obtaining step is capable of storing information. It is also preferable that the program makes the computer execute a step for resetting the function limit when a prescribed period of time has passed after the determining step.

BRIEF DESCRIPTION OF THE DRAWINGS

The objects and features of the present invention will become more apparent from the consideration of the following detailed description taken in conjunction with the accompanying drawings in which:

FIG. 7 is a block diagram showing the configuration of electric equipment according to the second embodiment of the present invention;

FIG. 11 is a block diagram showing the configuration of electric equipment according to the third embodiment of the present invention;

FIG. 13 is a diagram showing an example of the cryptographic key in the third embodiment;

FIG. 15 is a diagram showing an example of a function limit table; and

FIG. 16 is a flowchart showing an example of the operation of the electric equipment depicted according to the fourth embodiment of the present invention for canceling a function limit.

DESCRIPTION OF THE PREFERRED EMBODIMENTS

Figure 1:
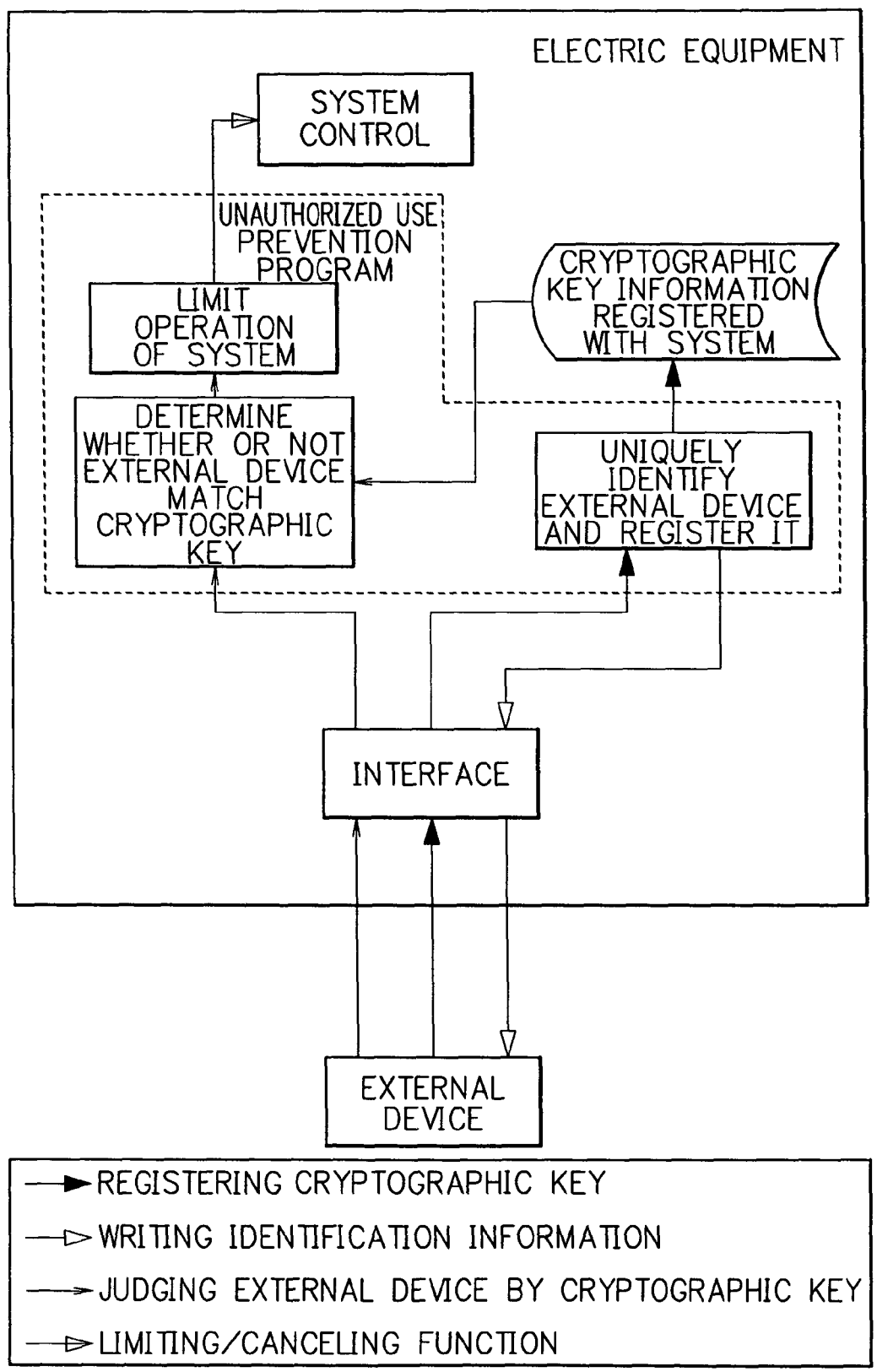
FIG. 1 is a diagram for giving an overview of the present invention.

Referring now to the drawings, a description of preferred embodiments of the present invention will be given in detail.

In the beginning, a brief description of the gist of the present invention will be made. FIG. 1 is a diagram for giving an overview of the present invention. In electric equipment according to the present invention, a limit is imposed on at least part of functions of the electric equipment, and the limited function is not available unless the limit is canceled. For example, all functions or a specific function, such as providing access to specific information, of the electric equipment may be made unavailable by the function limit.

Besides, the electric equipment according to the present invention is provide with a function for uniquely or almost uniquely identifying an external device connected thereto via an interface (e.g. a function for obtaining a CIS tuple or a serial number from the external device). When information that uniquely identifies an external device, such as a MAC address, a serial number, etc., is registered with the connected external device, the electric equipment can identify the device by obtaining the information from the device. On the other hand, when information that uniquely identifies an external device is not registered with the connected external device, the electric equipment identifies the device on a product level or a manufacturer level by obtaining its product name and manufacturer's name registered with the device. Such information is registered with existing external devices in advance, and there is no need to store extra information in external devices to implement the present invention.

In addition, when the connected external device is capable of storing information, the electric equipment may write the information that uniquely identifies the device thereto. For example, the electric equipment may write a volume serial number as format information to the external device that is capable of storing information.

The above-mentioned information that uniquely or almost uniquely identifies an external device will hereinafter be referred to as "device identification information". The device identification information is used as a cryptographic key to cancel a limit set to the function of the electric equipment. More specifically, the device identification information that indicates a specific external device is previously stored in a nonvolatile memory or the like as a cryptographic key. When device identification information obtained from an external device connected via an interface to the electric equipment matches the cryptographic key, a function limit is canceled.

Figure 2:
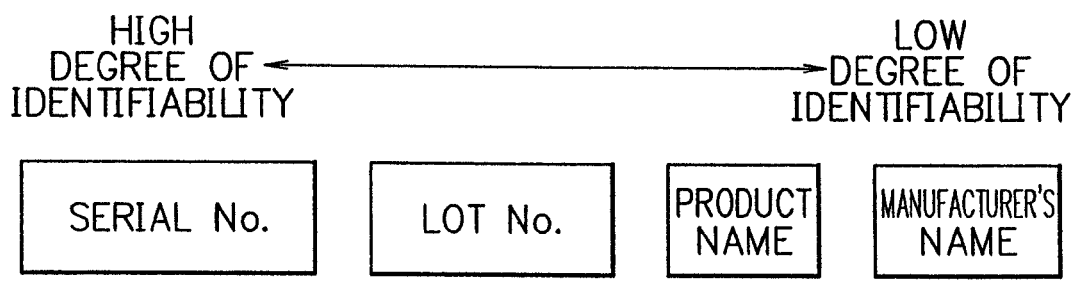
FIG. 2 is a diagram showing an example of types of device identification information and degrees of identifiability.

Additionally, as shown in FIG. 2, to what degree the external device can be identified (degrees of identifiability) varies according to the type of device identification information. For example, when a serial number is given as device identification information, it is possible to specify one external device. Meanwhile, when a lot number is given, an external device can only be identified as any one of devices manufactured by the lot.

The electric equipment of the present invention operates in the manner described above, thus preventing the theft of electric equipment and the stealing of information. Incidentally, at least part of the above-mentioned operations of the electric equipment, being indicated by dashed lines in FIG. 1, can be carried out in software by a computer. In this case, the present invention can be implemented making use of conventional hardware.

First Embodiment

The first embodiment of the present invention will next be described with reference to the drawings.

Figure 3:
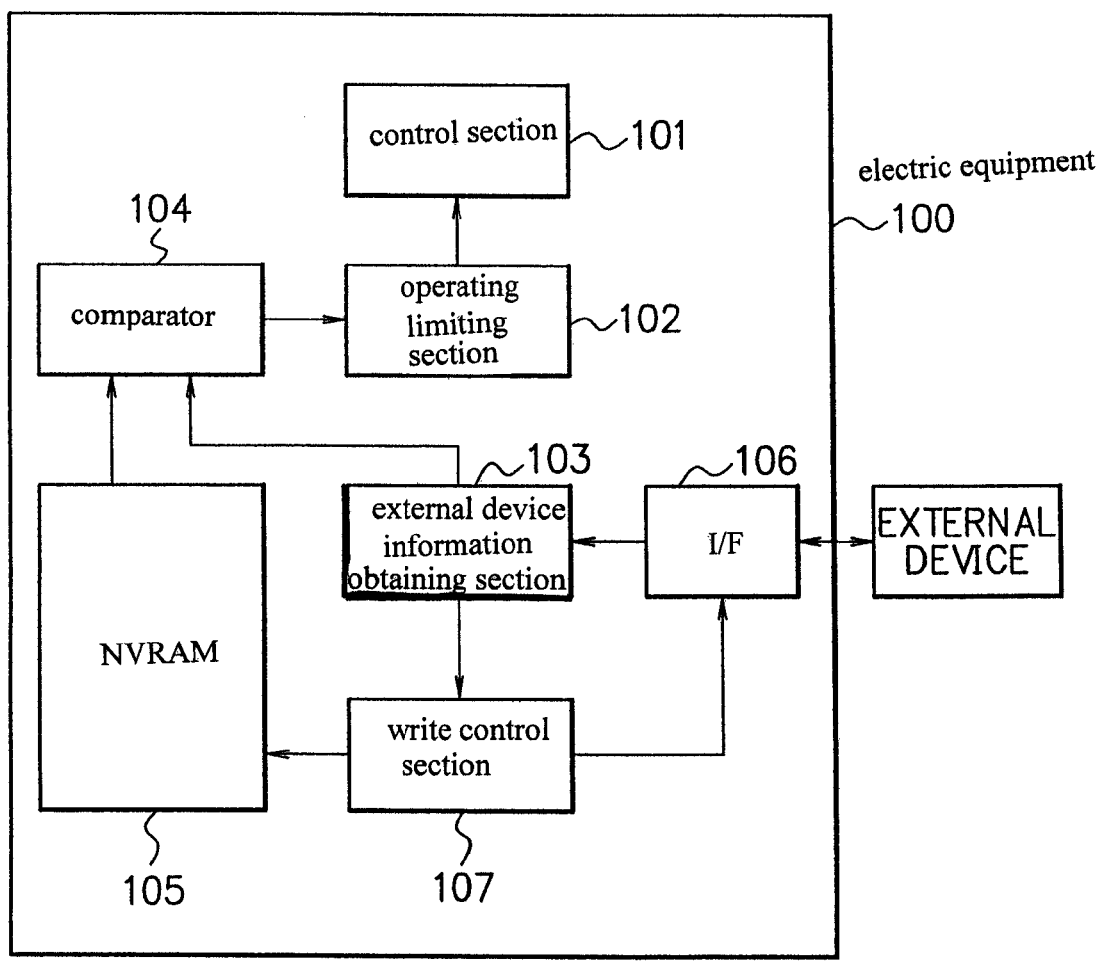
FIG. 3 is a block diagram showing the configuration of electric equipment according to the first embodiment of the present invention.

FIG. 3 is a block diagram showing the configuration of electric equipment to which an unauthorized use prevention program according to the first embodiment of the present invention is applied. Referring to FIG. 3, electric equipment 100 comprises a control section 101, an operation limiting section 102, an external device information obtaining section 103, a comparator 104, an NVRAM 105, an I/F 106 and a write control section 107. The control section 101 is an operation part for performing original functions (computing function, communication function, etc.) of the electric equipment 100. The operation limiting section 102 sets a limit (function limit) to at least part of the original functions of the electric equipment 100 so that the control section 101 cannot execute the limited function. The operation limiting section 102 also cancels the limit. The external device information obtaining section 103 obtains device identification information (CIS tuple, serial number, etc.) from an external device connected via the I/F 106 to the electric equipment 100. The comparator 104 compares device identification information registered as a cryptographic key with the NVRAM 105 to the device identification information obtained from the external device, and determines whether or not the obtained information matches the cryptographic key. The NVRAM 105 stores the cryptographic key that is used as the basis for decision as to whether or not to cancel the limit set to the function of electric equipment 100. The I/F 106 is an interface for connecting the external device to the electric equipment 100. Known interfaces such as a PC card slot, a USB (Universal Serial Bus) connector, a serial port and a parallel port can be used as the I/F 106. The write control section 107 determines to what degree the external device can be identified (uniquely, on a product level, on a manufacturer level, etc.) based on the device identification information obtained by the external device information obtaining section 103. In addition, when the external device is capable of information storage and also the obtained device identification information does not uniquely identify the device, the write control section 107 generates information that uniquely identifies the device and stores it in the device.

Figure 4:
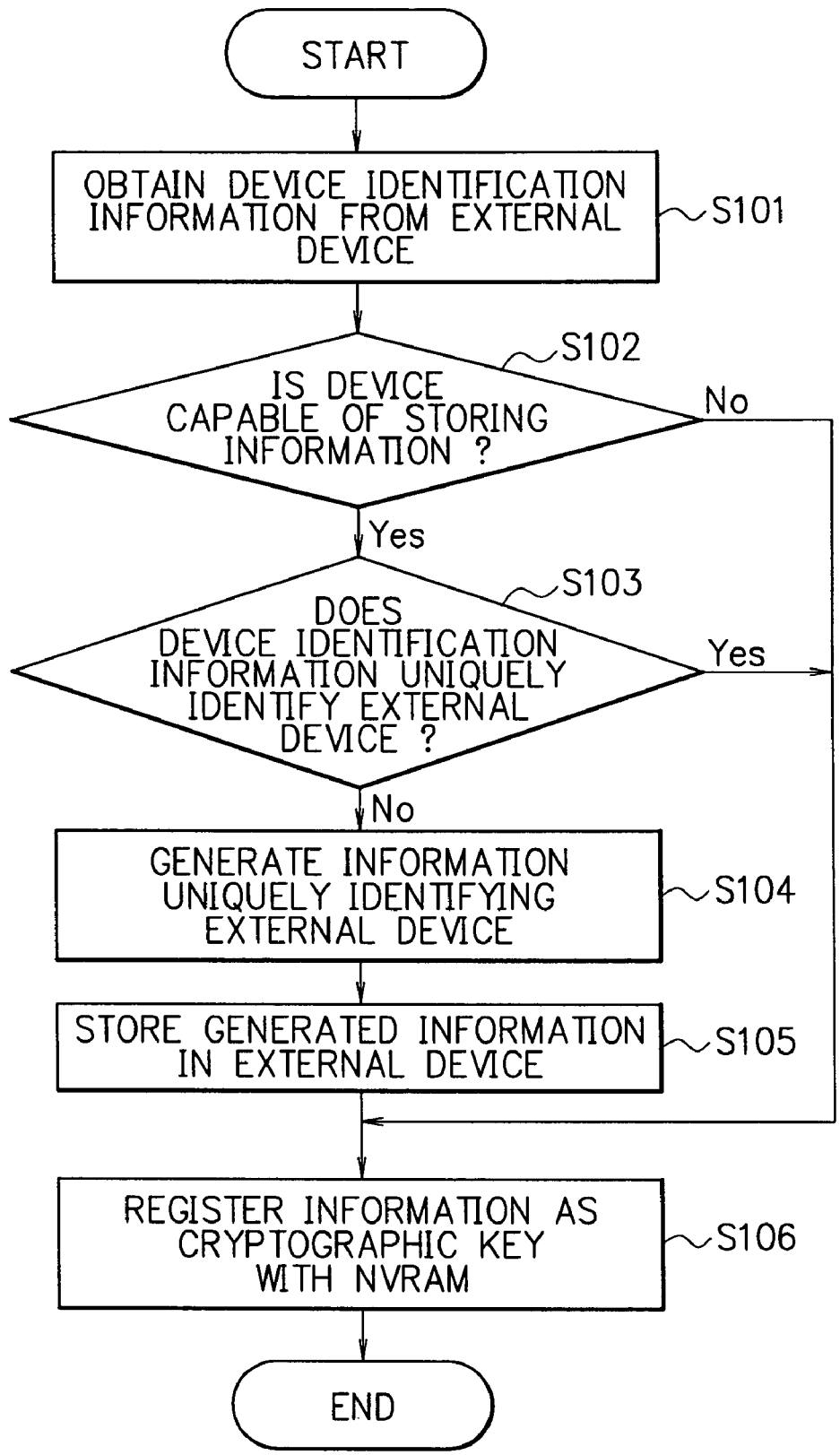
FIG. 4 is a flowchart showing an example of the operation of the electric equipment depicted in FIG. 3 for registering a cryptographic key.

In the following, the operation of the electric equipment 100 will be explained. First, a description will be given of the operation of the electric equipment 100 to register information that uniquely identifies a connected external device as a cryptographic key with the NVRAM 105 in reference to FIG. 4.

When an external device is connected to the I/F 106, the external device information obtaining section 103 obtains device identification information from the connected external device (step S101). When no external device is connected to the I/F 106, the external device information obtaining section 103 obtains information indicating that there is no connected external device as device identification information. The write control section 107 determines whether or not the connected external device is capable of storing information based on the device identification information obtained by the external device information obtaining section 103 (step S102).

When the connected external device is capable of storing information (step S102, Yes), the write control section 107 determines whether or not the device identification information uniquely identifies the device (step S103). When the device identification information does not uniquely identify the external device (step S103, No), the write control section 107 generates information that uniquely identifies the device (step S104), and stores it in the device (step S105). Thereby, when the external device information obtaining section 103 obtains device identification information from the external device afterwards, the information written to the device at step S105 will be obtained. Subsequently, the write control section 107 feeds the NVRAM 105 with the same information as stored in the external device to register it as a cryptographic key for canceling a function limit (step S106).

On the other hand, when the connected external device is not capable of storing information (step S102, No), or when the device identification information uniquely identifies the device (step S103, Yes), the write control section 107 outputs the obtained device identification information directly to the NVRAM 105 to register it as a cryptographic key for canceling a function limit (step S106).

Figure 5:
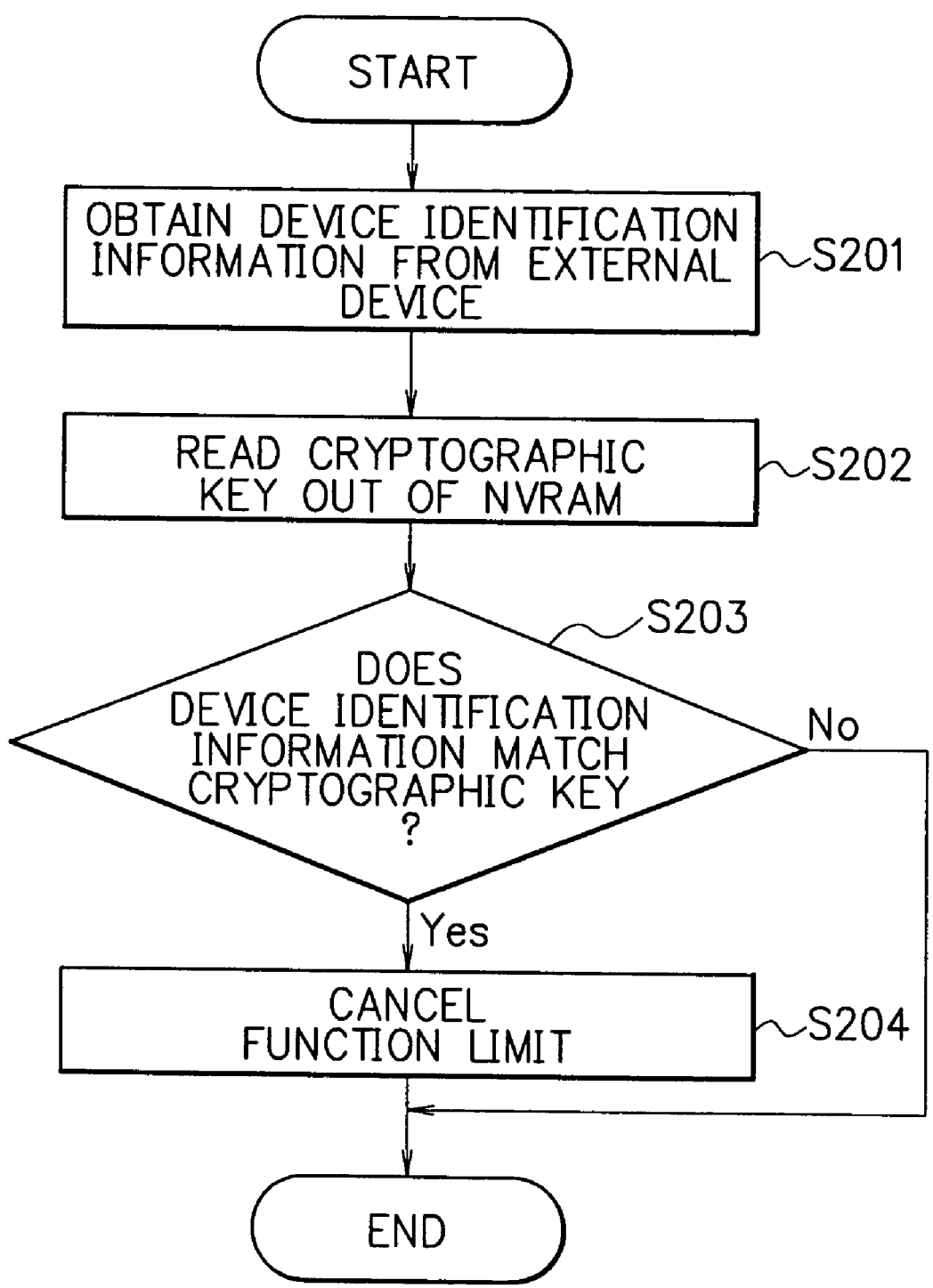
FIG. 5 is a flowchart showing an example of the operation of the electric equipment depicted in FIG. 3 for canceling a function limit.

FIG. 5 is a flowchart showing the operation of the electric equipment 100 to cancel a limit set to the function of the electric equipment 100 with an external device connected via the I/F 106 thereto.

When an external device is connected to the I/F 106, the external device information obtaining section 103 obtains device identification information from the connected external device (step S201). The comparator 104 obtains the device identification information of the external device being connected to the I/F 106 from the external device information obtaining section 103, and reads device identification information registered as a cryptographic key out of the NVRAM 105 (step S202). The comparator 104 compares the obtained device identification information to the cryptographic key, and determines whether or not the two match (step S203).

When the obtained device identification information matches the cryptographic key (step S203, Yes), the comparator 104 instructs the operation limiting section 102 to cancel the limit which the operation limiting section 102 set to the control section 101 so that limited function becomes available (step S204).

On the other hand, when the obtained device identification information does not match the cryptographic key (step S203, No), the limit set to the control section 101 is not canceled.

When the operation for the cancellation of a function limit is carried out only once, the external device corresponding to the cryptographic key is required to be connected to the electric equipment 100 only when the function limit is canceled. Even if the external device corresponding to the cryptographic key is disconnected from the electric equipment 100 after the function limit has been canceled, the electric equipment 100 can be used. Consequently, in the case where a less frequently used external device is registered as a cryptographic key with the NVRAM 105, the less frequently used external device may be disconnected after canceling a function limit so that another external device can be connected to the I/F 106 for use.

Figure 6:
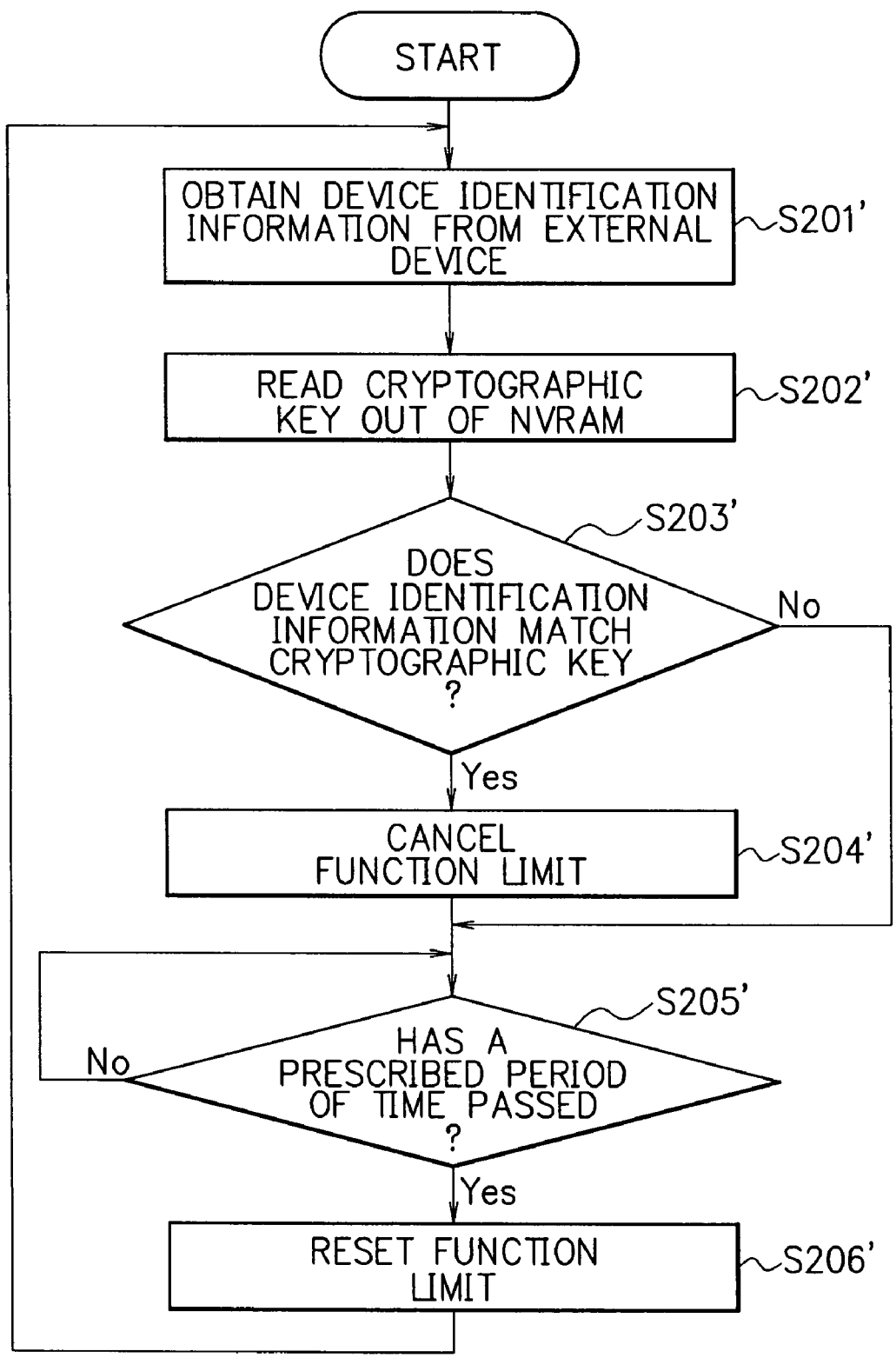
FIG. 6 is a flowchart showing another example of the operation of the electric equipment depicted in FIG. 3 for canceling a function limit.

Besides, the operation for the cancellation of a function limit may be performed on a regular basis. FIG. 6 is a flowchart showing the operation of the electric equipment 100 in this case. In FIG. 6, steps S201' to S204' are the same as aforementioned steps S201 to S204 shown in FIG. 5, and therefore do not require detailed explanation.

When a prescribed period of time has passed since the completion of step S203' (step S205', Yes), the operation limiting section 102 resets the limit that was canceled at step S204' to the control section 101 so that the limited function becomes unavailable (step S206).

After that, returning to step S201', the comparator 104 compares the device identification information that the external device information obtaining section 103 has obtained from the external device being connected to the I/F 106 to device identification information registered as a cryptographic key with the NVRAM 105, and determines whether or not to cancel a function limit (steps S 201' to S203').

In the case where the operation for the cancellation of a function limit is performed on a regular basis, the comparator 104 checks whether or not the external device registered as a cryptographic key with the NVRAM 105 is connected to the I/F 106 after the lapse of a certain period of time. Accordingly, even if a function limit is once canceled, the function limit is reset to the control section 101, which improves security for the electric equipment 100.

For example, if the electric equipment 100 whose function limit was canceled is stolen, the function limit is reset after a certain period of time, and the electric equipment 100 cannot be used without an external device registered as a cryptographic key with the NVRAM 105. Thus, the theft of the electric equipment 100 can be prevented.

In addition, when the length of time before resetting a function limit is set shorter, the electric equipment 100 can be nonusable unless the external device registered as a cryptographic key with the NVRAM 105 is connected via the I/F 106 thereto. Assuming that a function limit is reset in $1/100$ sec. after the comparator 104 compares device identification information obtained from an external device connected to the I/F 106 with a cryptographic key, it is practically impossible to use the electric equipment 100 unless the external device registered as a cryptographic key remains connected thereto.

As just described, the electric equipment 100 may perform the operation for the cancellation of a function limit only once or repeatedly. In other words, there are two modes of using the electric equipment 100. In one mode, the external device registered as a cryptographic key is connected to the electric equipment 100 only at the start of operations (when a function limit is canceled), and does not need to be connected thereto afterwards. In the other, the external has to be connected to the electric equipment 100 during operations. These modes can be selected or switched according to the character of a system which adopts the electric equipment 100.

In accordance with the first embodiment of the present invention, the electric equipment has the capability to obtain device identification information from a connected external device. A limit is imposed on at least part of functions of the electric equipment so that the limited function is unavailable. At the same time, a specific external device (specific device identification information) is previously registered as a condition for the cancellation of the limit. That is, the limit is canceled on the condition that a specific external device is connected to the electric equipment, or specific device identification information is obtained from the connected external device. Consequently, the limited function is available only when the external device registered as a condition of the cancellation of the limit is once connected to the electric equipment or is being connected thereto.

Second Embodiment

The second embodiment of the present invention will next be described with reference to the drawings.

FIG. 7 is a block diagram showing the configuration of electric equipment to which an unauthorized use prevention program according to the second embodiment of the present invention is applied. In FIG. 2, electric equipment 200 is basically similar to the electric equipment 100 in FIG. 1 except for a plurality of I/Fs 106 (106a, 106b). Incidentally, like reference numerals refer to corresponding parts throughout the drawings. In this embodiment, device identification information is used singularly or in combination as a cryptographic key for canceling a function limit.

Figure 8:
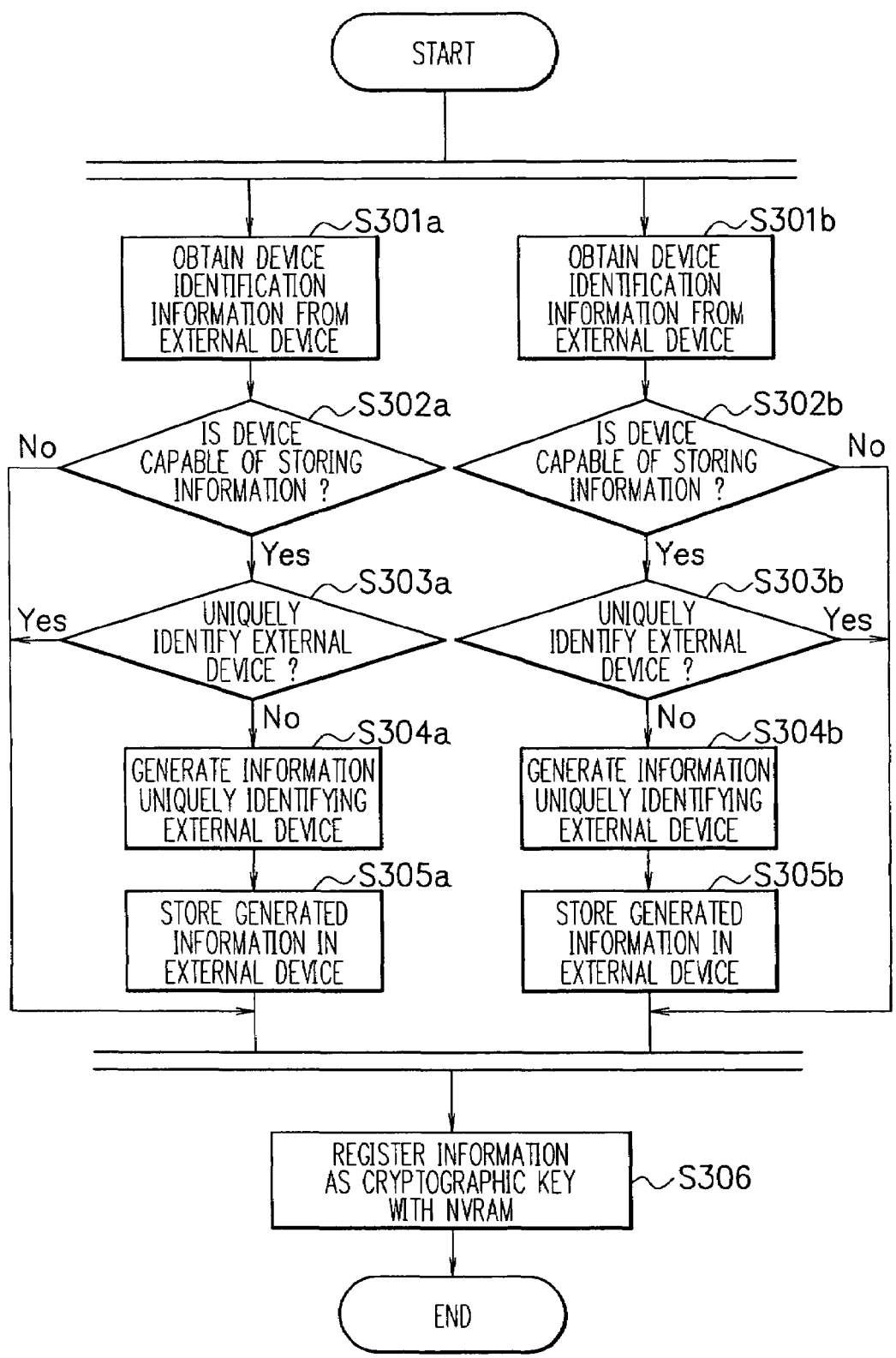
FIG. 8 is a flowchart showing an example of the operation of the electric equipment depicted in FIG. 7 for registering a cryptographic key.

In the following, a description will be given of the operation of the electric equipment 200. FIG. 8 is a flowchart showing the operation of the electric equipment 200 to register a pair of two pieces of device identification information as a cryptographic key with the NVRAM 105.

When external devices are connected to the I/Fs 106a and 106b, respectively, the same process described previously for steps S101 to S105 in FIG. 4 is performed for the respective external devices connected to the I/Fs 106a and 106b (step S301a to S305a, step S301b to S305b).

After that, the write control section 107 registers the obtained device identification information or the same information as stored in the external device(s) with the NVRAM 105 as a cryptographic key (step S306).

Figure 9:
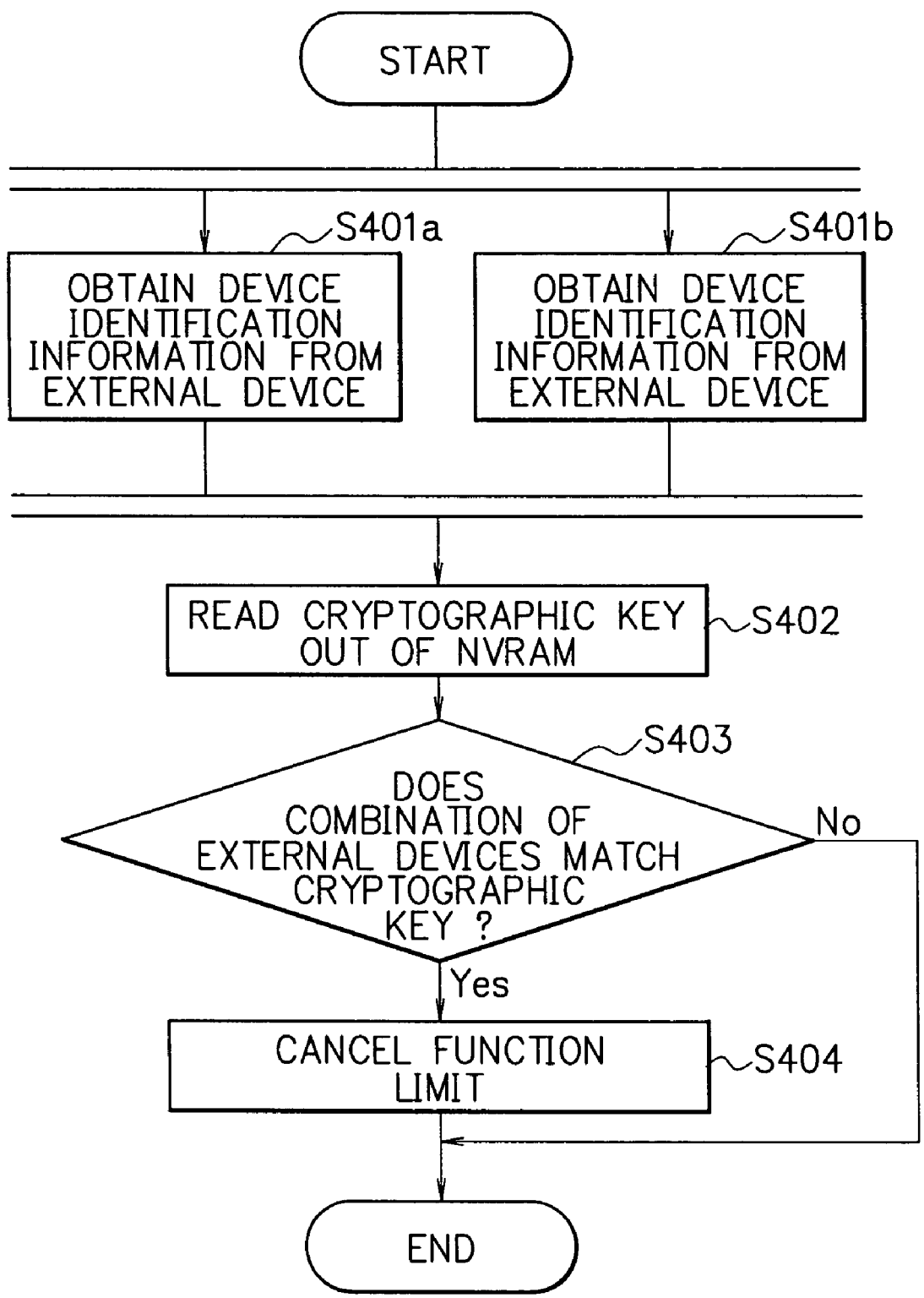
FIG. 9 is a flowchart showing an example of the operation of the electric equipment depicted in FIG. 7 for canceling a function limit.

FIG. 9 is a flowchart showing the operation of the electric equipment 200 to cancel a limit set to the function of the electric equipment 200 with external devices connected via the respective I/Fs 106a and 106b thereto.

When external devices are connected to the I/Fs 106a and 106b, respectively, the external device information obtaining section 103 obtains device identification information from both the connected external devices (step S401a, S401b). Incidentally, when no external device is connected to the I/Fs 106a and 106b, the external device information obtaining section 103 obtains information indicating that there is no connected external device as device identification information. The comparator 104 obtains the device identification information of the external devices being connected to the I/Fs 106a and 106b from the external device information obtaining section 103, and reads a pair of two pieces of device identification information registered as a cryptographic key out of the NVRAM 105 (step S402). The comparator 104 determines whether or not the paired external devices (a combination of the device identification information obtained from the external devices) match the cryptographic key (step S403).

When the paired external devices correspond to the cryptographic key (step S403, Yes), the comparator 104 instructs the operation limiting section 102 to cancel the limit which the operation limiting section 102 set to the control section 101 so that limited function becomes available (step S404).

On the other hand, when the pair do not match the cryptographic key (step S403, No), the operation limiting section 102 does not cancel the limit set to the control section 101.

Figure 10:
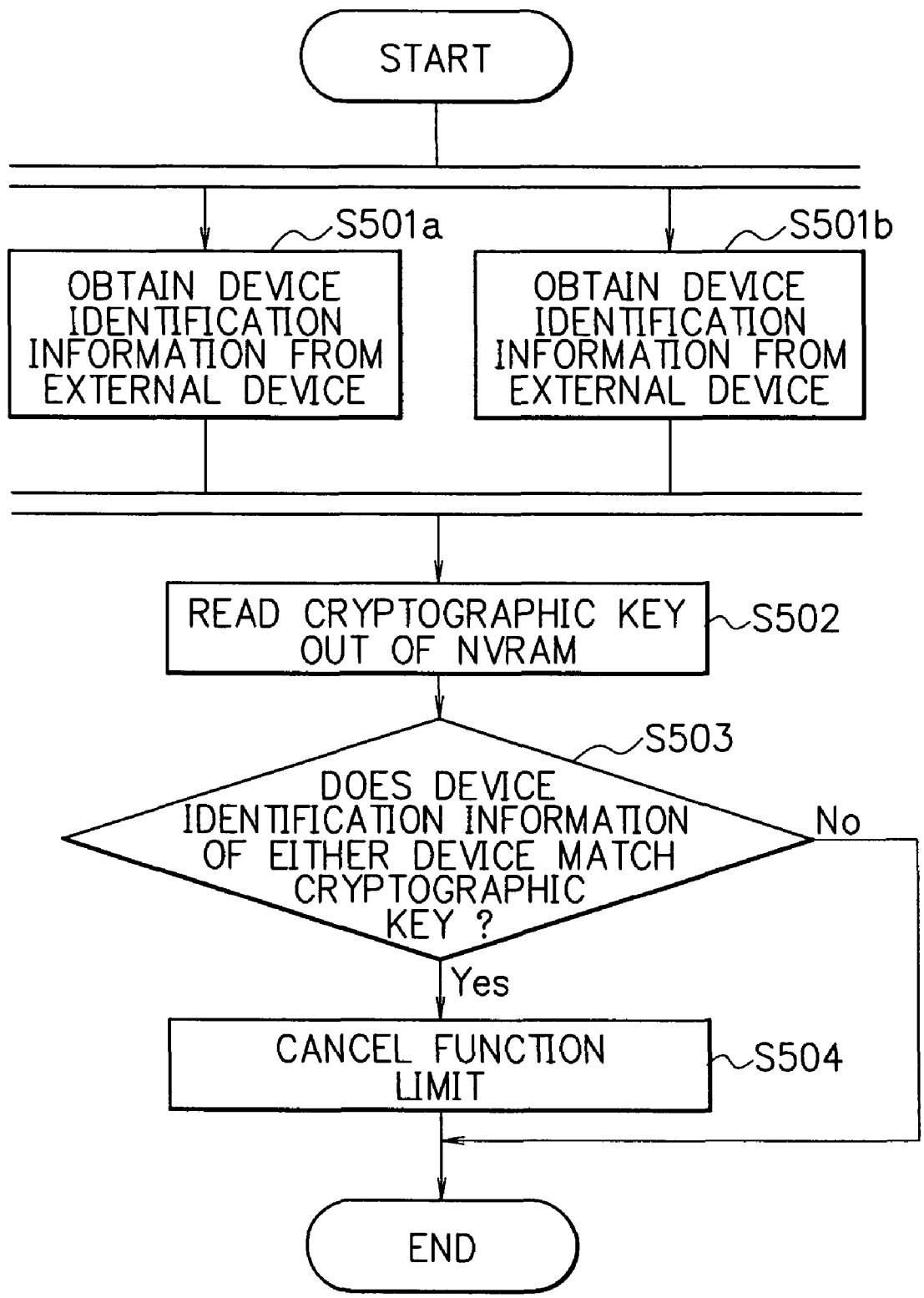
FIG. 10 is a flowchart showing another example of the operation of the electric equipment depicted in FIG. 7 for canceling a function limit.
Figure 12:
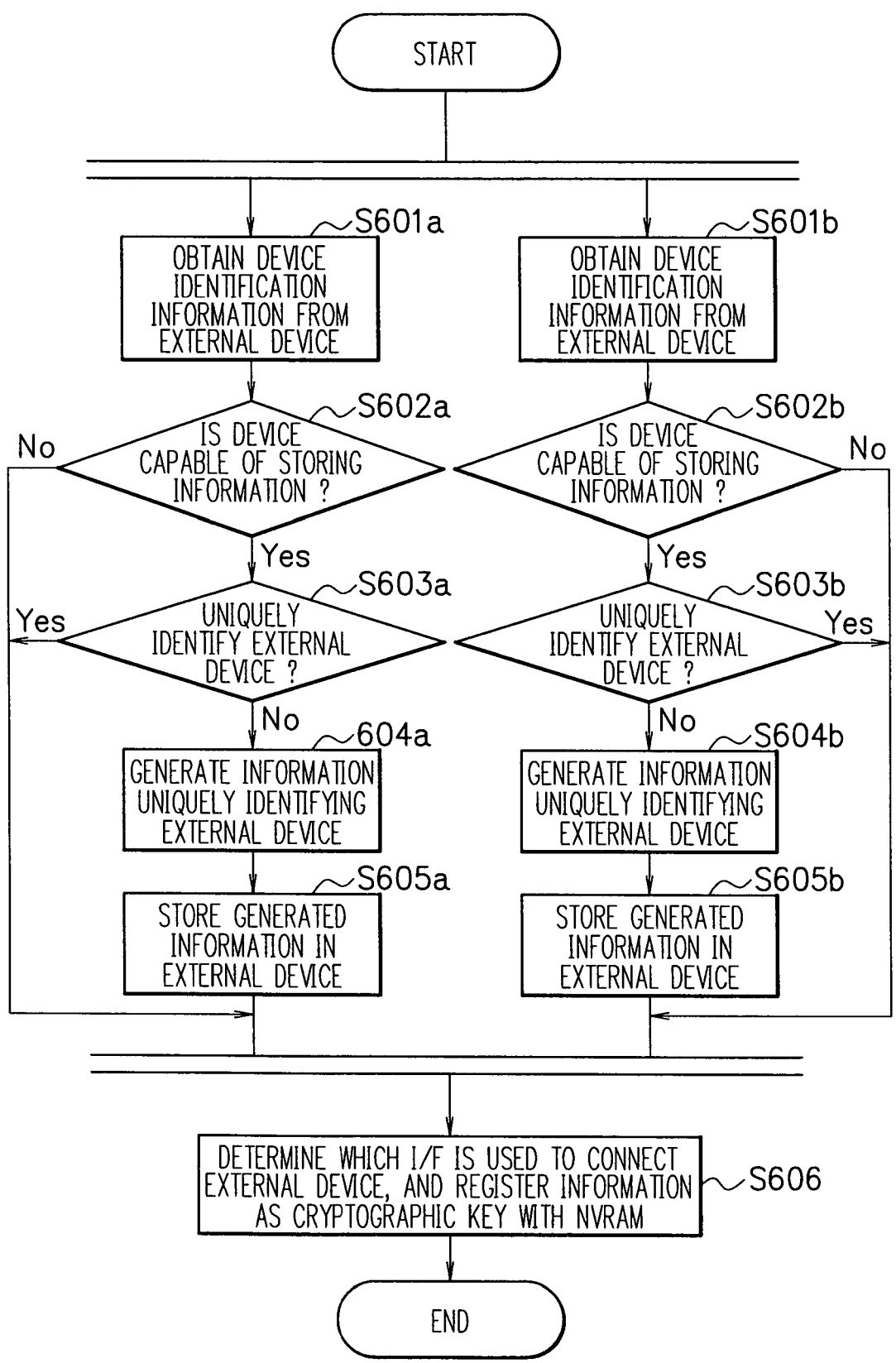
FIG. 12 is a flowchart showing an example of the operation of the electric equipment depicted in FIG. 11 for registering a cryptographic key.

FIG. 10 is another flowchart showing the operation of the electric equipment 200 to cancel a limit set to the function of the electric equipment 200 with external devices connected via the respective I/Fs 106a and 106b thereto. Referring to FIG. 10, a description will be made of the operation of the electric equipment 200 to restore the limited function when a single piece of device identification information is registered with the NVRAM 105 as a cryptographic key.

When one or two external devices are connected to the I/Fs 106a and/or 106b, the external device information obtaining section 103 obtains device identification information from the connected external device(s) (step S501a, S501b). Incidentally, when no external device is connected to the I/Fs 106a and 106b, the external device information obtaining section 103 obtains information indicating that there is no connected external device as device identification information. The comparator 104 obtains the device identification information of the external device(s) being connected to the I/Fs 106a and/or 106b from the external device information obtaining section 103, and reads device identification information registered as a cryptographic key out of the NVRAM 105 (step S502). The comparator 104 determines whether or not the device identification information of the external device connected to the I/F 106a or I/F 106b matches the cryptographic key (step S503).

When the device identification information matches the cryptographic key (step S503, Yes), the comparator 104 instructs the operation limiting section 102 to cancel the limit which the operation limiting section 102 set to the control section 101 so that limited function becomes available (step S504).

On the other hand, when the device identification information does not match the cryptographic key (step S503, No), the operation limiting section 102 leaves the specific function unavailable.

While the electric equipment 200 has been described as provided with two I/Fs 106a and 106b, the electric equipment 200 may be provided with three or more I/Fs. In the case where the electric equipment 200 has three I/Fs, a piece of device identification information, a combination of two pieces of device identification information and a combination of three pieces of device identification information can be registered with the NVRAM 105 as a cryptographic key. That is, when the electric equipment has n (n: an integer bigger than 2) I/Fs, a single piece of device identification information or combinations of two to n pieces of device identification information can be registered with the NVRAM 105 as a cryptographic key.

In addition, as with the electric equipment 100, the electric equipment 200 may perform the operation for the cancellation of a function limit repeatedly. In this case, a canceled function limit is set again when a prescribed period of time has passed after the comparator 104 compares device identification information obtained from the connected external device with a cryptographic key in the same manner as described previously for the first embodiment in connection with FIG. 6.

As set forth hereinabove, in accordance with the second embodiment of the present invention, the electric equipment has the capability to obtain device identification information from one or more connected external devices. A limit is imposed on at least part of functions of the electric equipment so that the limited function is unavailable. At the same time, one or more specific external devices (one or more pieces of specific device identification information) are previously registered as a condition for the cancellation of the limit. That is, the limit is canceled on the condition that one or more specific external devices are connected to the electric equipment, or one or more pieces of specific device identification information are obtained from the connected external device(s). When a combination of plural external devices is previously registered as a condition for the cancellation of the limit, the limited function is available only if all external devices included in the combination are once connected to the electric equipment, or are being connected thereto.

Third Embodiment

The third embodiment of the present invention will next be described with reference to the drawings.

FIG. 11 is a block diagram showing the configuration of electric equipment to which an unauthorized use prevention program according to the third embodiment of the present invention is applied. As can be seen in FIG. 11, electric equipment 300 is basically similar to the electric equipment 200 in FIG. 7 except for a plurality of external device information obtaining sections 103 (103a, 103b). The external device information obtaining sections 103a obtains device identification information form an external device connected via the I/F 106a to the electric equipment 300. On the other hand, the external device information obtaining sections 103b obtains device identification information form an external device connected via the I/F 106b to the electric equipment 300. The device identification information obtained by the external device information obtaining sections 103a and 103b is registered with NVRAM 105 as a cryptographic key, or is used to determine whether or not to cancel a function limit in much the same manner as described previously for the second embodiment.

In the following, a description will be given of the operation of the electric equipment 300. FIG. 8 is a flowchart showing the operation of the electric equipment 300 to register a pair of two pieces of device identification information as a cryptographic key with the NVRAM 105. In FIG. 8, steps S601a to S605a and steps S601b to S605b are the same as aforementioned steps S101 to S105 in FIG. 4, and therefore do not require any further explanation.

After the process from step S601 to S605 has been performed, the write control section 107 registers the obtained device identification information or the same information as stored in the external device(s) with the NVRAM 105 as a cryptographic key (step S606).

In this embodiment, the device identification information obtained from the external devices connected respectively via the I/Fs 106a and 106b to the electric equipment 300 is fed into the write control section 107 separately by different routes. On this account, the write control section 107 deals with the device identification information obtained by the external device information obtaining sections 103a and 103b individually. Thus, the electric equipment 300 can differentiate an external device connected thereto via the I/F 106a from the same external device connected via the I/F 106b.

FIG. 13 is a diagram showing an example of a cryptographic key registered with the NVRAM 105 by the write control section 107. In this embodiment, a cryptographic key may include a further condition concerning interfaces to connect the respective external devices in addition to a condition concerning external devices to be connected to the electric equipment 300 as shown in FIG. 13.

Figure 14:
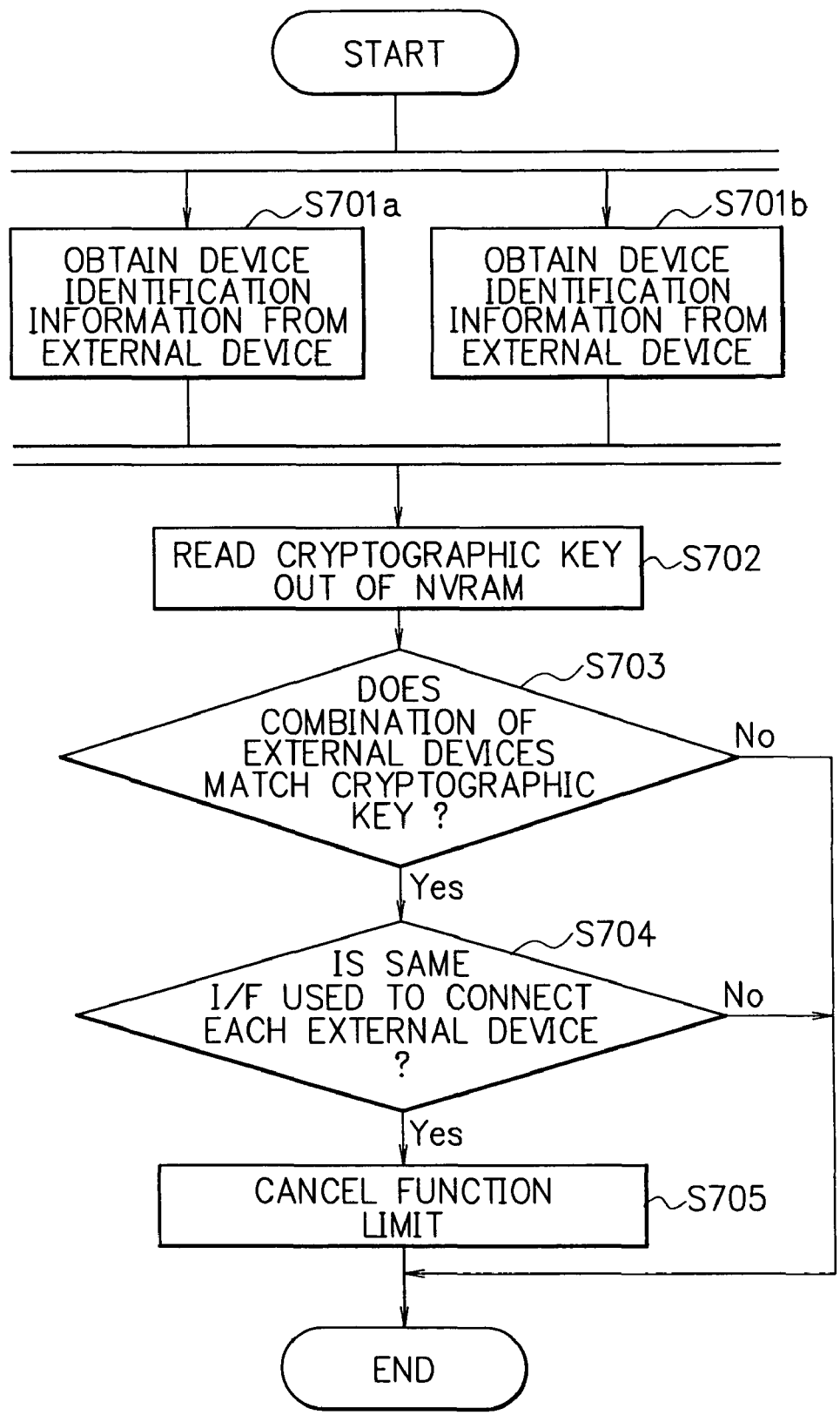
FIG. 14 is a flowchart showing an example of the operation of the electric equipment depicted in FIG. 11 for canceling a function limit.

FIG. 14 is a flowchart showing the operation of the electric equipment 300 to cancel a function limit set to the electric equipment 300 with external devices connected respectively via the I/Fs 106a and 106b thereto. Referring to FIG. 14, a description will be made of the operation of the electric equipment 300 to restore the limited function when a pair of two pieces of device identification information are registered with the NVRAM 105 as a cryptographic key.

When external devices are connected to the I/Fs 106a and 106b, respectively, the external device information obtaining sections 103a and 103b obtain device identification information from the connected external devices (step S701a, S701b). Incidentally, when no external device is connected to the I/Fs 106a and 106b, the external device information obtaining sections 103a and 103b each obtain information indicating that there is no connected external device as device identification information. The comparator 104 obtains the device identification information of the external devices being connected respectively to the I/Fs 106a and 106b from the external device information obtaining sections 103a and 103b, and reads a combination of two pieces of device identification information registered as a cryptographic key out of the NVRAM 105 (step S702). The comparator 104 determines whether or not the paired external devices connected to the I/Fs 106a and 106b (a combination of device identification information of the external devices) match the combination of device identification information registered as a cryptographic key (step S703).

When the pair match the cryptographic key (step S703, Yes), the comparator 104 determines whether or not each of the external devices is connected to the electric equipment 300 via the same interface which was used for registering corresponding device identification information as a cryptographic key (step S704). When the respective external devices are connected to the electric equipment 300 via the same interfaces (step S704, Yes), the comparator 104 instructs the operation limiting section 102 to cancel the limit which the operation limiting section 102 set to the control section 101 so that limited function becomes available (step S705).

On the other hand, when a pair of two pieces of the device identification information obtained from the external devices being connected respectively to the I/Fs 106a and 106b do not match the combination of device identification information registered with the NVRAM 105 as a cryptographic key (step S703, No), or when the external devices are connected to the electric equipment 300 via different interfaces than that used for registering the device identification information as a cryptographic key (step S704, No), the operation limiting section 102 leaves the specific function unavailable.

As just described, in accordance with the third embodiment of the present invention, the electric equipment can determine witch interface is used to connect each external device. Consequently, when, for example, a pair of device identification information obtained from an external device A being connected to the I/F 106*a* and device identification information obtained from an external device B being connected to the I/F 106*b* are registered with the NVRAM 105 as a cryptographic key, if the external device B is connected to the I/F 106*a* and the external device A is connected to the I/F 106*b*, a function limit cannot be canceled. That is, the third embodiment is more effective than the second embodiment in preventing the theft of electric equipment and the stealing of information.

While the electric equipment 300 has been described as provided with two I/Fs 106*a* and 106*b*, the electric equipment 300 may be provided with three or more I/Fs as with the electric equipment 200 in the second embodiment. In the case where the electric equipment 300 has three I/Fs, a piece of device identification information, a combination of two pieces of device identification information and a combination of three pieces of device identification information can be registered with the NVRAM 105 as a cryptographic key. That is, when the electric equipment has n (n: an integer bigger than 2) I/Fs, a single piece of device identification information or combinations of two to n pieces of device identification information can be registered with the NVRAM 105 as a cryptographic key.

Besides, as with the electric equipment 100 and 200, the electric equipment 300 may perform the operation for the cancellation of a function limit repeatedly. In this case, a canceled function limit is set again when a prescribed period of time has passed after the comparator 104 compares device identification information obtained from the connected external device with a cryptographic key in the same manner as described previously for the first embodiment in connection with FIG. 6.

In the third embodiment of the present invention, interfaces for connecting respective external devices as well as device identification information of the external devices can be registered as a cryptographic key. Consequently, even if electric equipment and external devices registered as a cryptographic key for canceling a function limit are stolen, the function limit cannot be canceled unless the external devices are connected to the electric equipment via the same interfaces which were used for registering the cryptographic key, respectively. This makes it difficult for users who do not know conditions for canceling the function limit to use the electric equipment illegally and steal information, thus preventing the theft of the electric equipment and the stealing of information.

Fourth Embodiment

The fourth embodiment of the present invention will next be described with reference to the drawings.

In the fourth embodiment, various levels of function limits are set to electric equipment, and the respective function limits are canceled according to device identification information obtained from the connected external device. Incidentally, the electric equipment 100 of the first embodiment is also used in this embodiment.

The function limits on the electric equipment 100 are registered with the NVRAM 105 in the form of a function limit table. FIG. 15 is a diagram showing an example of the function limit table. In FIG. 15, "available function" indicates which function of the electric equipment 100 is available. "Nothing" means that all functions are unavailable. "Read" means that data can be read out. "Write" means that data can be written. "All" means that all functions of the electric equipment 100 including the setting of a system are available. On the other hand, "cryptographic key" indicates conditions for canceling function limits. "A", "B", and "C" mean that function limits are canceled on the condition that an "external device A", an "external device B" and an "external device C" are connected to the electric equipment 100 via the I/F 106, respectively. "Default" indicates an initial condition or an original (normal) state.

FIG. 16 is a flowchart showing the operation of the electric equipment 100 to cancel a limit set to the function of the electric equipment 100 with external devices connected thereto via the I/F 106. Referring to FIG. 16, a description will be made of the operation of the electric equipment 100 on the assumption that the above-described function limit table is registered with the NVRAM 105.

When an external device is connected to the I/F 106, the external device information obtaining section 103 obtains device identification information from the connected external device (step S801). The comparator 104 obtains the device identification information of the external device being connected to the I/F 106 from the external device information obtaining section 103, and reads a function limit table out of the NVRAM 105. The comparator 104 determines whether or not the device identification information which matches the device identification information obtained from the external device information obtaining section 103 is registered as a cryptographic key in the function limit table (step S802).

When the device identification information obtained from the external device information obtaining section 103 indicates "A", namely, when the external device A is connected via the I/F 106 to the electric equipment 100 (step S802, A), the operation limiting section 102 cancels all limits set to the control section 101 so that all the functions of the electric equipment 100 become available (step S803).

When the device identification information obtained from the external device information obtaining section 103 indicates "B", namely, when the external device B is connected via the I/F 106 to the electric equipment 100 (step S802, B), the operation limiting section 102 cancels limits on the read/write function only among the function limits set to the control section 101 (step S804).

When the device identification information obtained from the external device information obtaining section 103 indicates "C", namely, when the external device C is connected via the I/F 106 to the electric equipment 100 (step S802, C), the operation limiting section 102 cancels only a limit on the read function among the function limits set to the control section 101 (step S805).

When the device identification information obtained from the external device information obtaining section 103 indicates none of "A", "B" and "C", or when it indicates that no external device is connected to the electric equipment 100 (step S802, Others), the operation limiting section 102 cancels no function limit set to the control section 101, and all the functions of the electric equipment 100 are kept unavailable (step S806).

Next, a concrete example of the operation of the electric equipment 100 will be given. In the following description, "system administrator A" is the administrator of a system that adopts the electric equipment 100, "user B" is a user who uses the system constantly, "user C" and "user D" are users who use the system temporarily, and "outsider E" is a person who is not authorized to use the system.

The system administrator A previously registers external devices A, B and C with the NVRAM 105 as cryptographic keys in the same manner as in the above-described function limit table. After that, the system administrator A commits the external device B to the user B, and keeps the external device A in his/her possession. Besides, the system administrator A prepares to lend the external device C to temporary users.

When the system is in an original state, limits are imposed on all the functions of the electric equipment 100. Therefore, every user who intends to use the system is required to cancel the function limits using an external device.

For example, when the user B uses the system, he/she cancels the function limits by the external device B committed to him/her. On the other hand, when the user C intends to use the system, he/she borrows the external device C by permission of the system administrator A, and uses the system after canceling the function limits with the external device C. The user C returns the external device C after use. The same applies to the case where the user D uses the system. Besides, in the case where the outsider E tries to use the system illegally (without permission from the system administrator A), he/she cannot use the system since he/she cannot cancel the function limits.

While the electric equipment 100 has been described as provided with one I/F 106, the electric equipment 100 of this embodiment may be provided with a plurality of I/Fs as with the electric equipment 200 and electric equipment 300 in the second and third embodiments.

As set forth hereinabove, in accordance with the fourth embodiment of the present invention, various levels of function limits are set to the electric equipment, and the respective function limits are canceled according to the type of the connected external device. Thereby, the electric equipment is provided with various levels of security.

Incidentally, as with the electric equipment 100 in the first embodiment, the electric equipment 100 of the fourth embodiment may perform the operation for the cancellation of a function limit repeatedly. In this case, a canceled function limit is set again when a prescribed period of time has passed after the comparator 104 compares device identification information obtained from the connected external device with a cryptographic key in the same manner as described previously for the first embodiment in connection with FIG. 6.

The foregoing embodiments are for illustrative purpose only and are not intended to limit the scope of the invention. In the above-described embodiments, for example, information that uniquely identifies an external device is generated when device identification information obtained from the external device does not uniquely identify the device. However, this may not always be the case.

Besides, although the cryptographic key is stored in the NVRAM 105 in the above-described embodiments, any storage can be used to store the cryptographic key as long as the storage is nonvolatile. For example, a high-capacity storage such as a hard disk drive may be used for a large amount of information.

In addition, the data structures of the cryptographic key and function limit table have been given merely by way of example and without limitation.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An electric apparatus comprising:
    a function limiting module for setting a function limit to the electric apparatus so that at least part of functions of the electric apparatus become unavailable;
    a plurality of interfaces for connecting external devices to the electric apparatus;
    a module for obtaining device identification information from an external device connected via one of the plurality of interfaces to the electric apparatus to identify the external device;
    a module for generating connection route information indicating which interface of the plurality of interfaces is used to connect the external device that has provided the device identification information;
    a module for associating the function limit with a combination of the device identification information and connection route information to obtain a cryptographic key;
    a memory for storing at least one cryptographic key;
    a determining module for determining whether a second combination of device identification information obtained from each external device of one or more external devices connected via one of the interfaces to the electric apparatus and connection route information for each external device of the one or more external devices matches the cryptographic key stored in the memory; and
    a limit canceling module for canceling the function limit set by the function limiting module if the determining module determines that the second combination of the obtained device information and connection route information matches the cryptographic key stored in memory.

2. The electric apparatus claimed in claim 1, further comprising a module for having the external device that has provided the device identification information associated with the function limit store information that uniquely identifies the external device as corresponding to the device identification information if the external device is capable of storing information.

3. The electric apparatus claimed in claim 1, further comprising a module for resetting the function limit if a prescribed period of time has passed after the determining module made the determination.

4. The electric apparatus claimed in claim 1, further comprising:
    a module for having the external device that has provided the device identification information associated with the function limit store information that uniquely identifies the external device as corresponding to the device identification information if the external device is capable of storing information; and
    a module for resetting the function limit if a prescribed period of time has passed after the determining module made the determination.

5. A method for preventing the unauthorized use of an electric apparatus including a plurality of interfaces to connect external devices thereto, comprising:
    a function limiting step for setting a function limit to the electric apparatus so that at least part of functions of the electric apparatus become unavailable;
    a first device identification information obtaining step for obtaining device identification information from an external device connected via one of the interfaces to the electric equipment to identify the external device;
    a first connection route information generating step for generating first connection route information indicating which interface is used to connect the external device to the electric apparatus at the first device identification information obtaining step;

a step for associating the function limit with a combination of the device identification information and the connection route information to obtain a cryptographic key;

a step for storing the cryptographic key in a memory;

a second device identification information obtaining step for obtaining second device identification information from a second external device connected via one of the interfaces to the electric apparatus to identify the second external device;

a second connection route information generating step for generating second connection route information indicating which interface is used to connect the second external device to the electric apparatus at the second device identification information obtaining step;

a determining step for determining whether a second combination of the second device identification information obtained at the second device identification information obtaining step and the second connection route information matches the cryptographic key stored in the memory; and a limit canceling step for canceling the function limit set at the function limiting step if it is determined at the determining step that the second combination of the information obtained at the second device identification information obtaining step and the second connection route information matches the cryptographic key.

6. The method for preventing the unauthorized use of an electric apparatus claimed in claim 5, further comprising a step for having the external device that has provided the device identification information associated with the function limit store information that uniquely identifies the external device as corresponding to the device identification information after the first device identification information obtaining step if the external device connected to the electric apparatus at the first device identification information obtaining step is capable of storing information.

7. The method for preventing the unauthorized use of an electric apparatus claimed in claim 5, further comprising a step for resetting the function limit if a prescribed period of time has passed after the determining step.

8. The method for preventing the unauthorized use of an electric apparatus claimed in claim 5, further comprising:

a step for having the external device that has provided the device identification information associated with the function limit store information that uniquely identifies the external device as corresponding to the device identification information after the first device identification information obtaining step if the external device connected to the electric apparatus at the first device identification information obtaining step is capable of storing information; and a step for resetting the function limit if a prescribed period of time has passed after the determining step.

9. A program recorded on a computer storage medium for preventing the unauthorized use of an electric apparatus, which is built into the electric apparatus including a plurality of interfaces to connect external devices thereto, and the program enabling a computer to control the electric apparatus, wherein the program includes the steps of:

a function limiting step for setting a function limit to the electric equipment so that at least part of functions of the electric apparatus become unavailable;

a first device identification information obtaining step for obtaining device identification information from an external device connected via one of the plurality of interfaces to the electric apparatus to identify the external device;

a first connection route information generating step for generating first connection route information indicating which interface of the plurality of interfaces is used to connect the external device to the electric apparatus at the first device identification information obtaining step;

a step for associating the function limit with a combination of the device identification information and the connection route information to obtain a cryptographic key;

a step for storing the cryptographic key in a memory;

a second device identification information obtaining step for obtaining a second device identification information from a second external device connected via one of the plurality of interfaces to the electric apparatus to identify the second external device;

a second connection route information generating step for generating second connection route information indicating which interface of the plurality of interfaces is used to connect the second external device to the electric apparatus at the second device identification information obtaining step;

a determining step for determining whether a second combination of the second device identification information obtained at the second device identification information obtaining step and the second connection route information matches the cryptographic key stored in the memory; and a limit canceling step for canceling the function limit of the one or more function limits set at the function limiting step if it is determined at the determining step that the second combination of the information obtained at the second device identification information obtaining step and the second connection route information matches the cryptographic key.

10. The program recorded on a computer storage medium claimed in claim 9, wherein the program comprises the further step of having the external device that has provided the device identification information associated with the function limit store information that uniquely identifies the external device as the device identification information after the first device identification information obtaining step if the external device connected to the electric apparatus at the first device identification information obtaining step is capable of storing information.

11. The program recorded on a computer storage medium claimed in claim 9, wherein the program comprises the further step of resetting the function limit if a prescribed period of time has passed after the determining step.

12. The program recorded on a computer storage medium claimed in claim 9, wherein the program comprises the further steps of:

a step for having the external device that has provided the device identification information store information that uniquely identifies the external device as the device identification information after the first device identification information obtaining step if the external device connected to the electric apparatus at the first device identification information obtaining step is capable of storing information; and a step for resetting the function limit if a prescribed period of time has passed after the determining step.

* * * * *